United States Patent
Yu et al.

(10) Patent No.: US 11,567,781 B2
(45) Date of Patent: Jan. 31, 2023

(54) DRIVE CONTROL METHOD AND APPARATUS, AND DISPLAY DEVICE

(71) Applicants: Beijing BOE Display Technology Co., Ltd., Beijing (CN); BOE Technology Group Co., Ltd., Beijing (CN)

(72) Inventors: Shuhuan Yu, Beijing (CN); Xin Duan, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 235 days.

(21) Appl. No.: 16/647,131

(22) PCT Filed: Mar. 29, 2019

(86) PCT No.: PCT/CN2019/080367
§ 371 (c)(1),
(2) Date: Mar. 13, 2020

(87) PCT Pub. No.: WO2019/214364
PCT Pub. Date: Nov. 14, 2019

(65) Prior Publication Data
US 2021/0157608 A1 May 27, 2021

(30) Foreign Application Priority Data
May 7, 2018 (CN) .......................... 201810428187.3

(51) Int. Cl.
*G06F 9/4401* (2018.01)
*G06F 9/38* (2018.01)
(Continued)

(52) U.S. Cl.
CPC .......... *G06F 9/4411* (2013.01); *G06F 9/3836* (2013.01); *G06F 9/44505* (2013.01);
(Continued)

(58) Field of Classification Search
CPC .. G06F 9/4411; G06F 9/3836; G06F 9/44505; G06F 3/2096; G09G 3/3688; G09G 2370/10
See application file for complete search history.

(56) References Cited

U.S. PATENT DOCUMENTS

2005/0062734 A1* 3/2005 Morita .................... G09G 5/006
345/204
2009/0109201 A1* 4/2009 Kim ...................... G09G 3/3648
345/206
(Continued)

FOREIGN PATENT DOCUMENTS

CN 102087836 A 6/2011
CN 105118475 A 12/2015
(Continued)

OTHER PUBLICATIONS

International search report of PCT application No. PCT/CN2019/080367 dated Jul. 4, 2019.

*Primary Examiner* — Michael A Faragalla
*Assistant Examiner* — Sujit Shah
(74) *Attorney, Agent, or Firm* — Fay Sharpe LLP

(57) ABSTRACT

Disclosed are a drive control method and apparatus and a display device. The drive control method may be applied to a controller, and include: adding at least one configuration instruction into a target region of one row of data to obtain a target row of data, wherein the configuration instruction is intended for self-configuration of a drive parameter by a first driver chip, and the target region includes at least one of a blank region and a region where display data is located; and sending the target row of data to the first driver chip.

13 Claims, 14 Drawing Sheets

(51) Int. Cl.
  *G06F 9/445* (2018.01)
  *G09G 3/36* (2006.01)
  *G09G 3/20* (2006.01)

(52) U.S. Cl.
  CPC ....... *G06F 9/44563* (2013.01); *G09G 3/2096* (2013.01); *G09G 3/3688* (2013.01); *G09G 2340/16* (2013.01); *G09G 2370/10* (2013.01)

(56) References Cited

U.S. PATENT DOCUMENTS

| | | |
|---|---|---|
| 2010/0020090 A1 | 1/2010 | Langtind et al. |
| 2014/0078133 A1* | 3/2014 | Lee ................ G09G 3/2092 345/213 |
| 2015/0084892 A1 | 3/2015 | Shirota et al. |
| 2017/0069257 A1* | 3/2017 | Lee ................ G09G 5/005 |
| 2018/0182329 A1* | 6/2018 | Yu ................ G09G 3/3685 |

FOREIGN PATENT DOCUMENTS

| | | |
|---|---|---|
| CN | 105405393 A | 3/2016 |
| CN | 107025877 A | 8/2017 |

* cited by examiner

DRIVE CONTROL METHOD AND APPARATUS, AND DISPLAY DEVICE

This application is a 371 of PCT Application No. PCT/CN2019/080367, filed Mar. 29, 2019, which claims priority to Chinese Patent Application No. 201810428187.3, filed on May 7, 2018 and entitled "DRIVE CONTROL METHOD AND APPARATUS, AND DISPLAY DEVICE", the entire contents of which are incorporated herein by reference.

TECHNICAL FIELD

The present disclosure relates to the field of panel drive technologies, and more particularly, relates to a drive control method, a drive control apparatus, and a display device.

BACKGROUND

A liquid crystal display device may generally include a liquid crystal display panel and a panel driver circuit for driving the liquid crystal display panel. The panel driver circuit may include a timing controller (TCON), a gate driver circuit, and a source driver circuit. The gate driver circuit includes a plurality of gate driver chips. The source driver circuit includes a plurality of source driver chips.

At present, two types of packets, control packet (CTRL packet) and data packet (video packet), are transmitted between the timing controller and the source driver chip in the liquid crystal display panel. The CTRL packet has two configuration instructions (also referred to as control instructions): CTRL_L and CTRL_F. CTRL_L is configured before and adjacent to a region where display data of each row of data sent to the source driver chip is located. CTRL_F is configured after a region where display data of the last row of data of each frame of data sent to the source driver chip is located, and is adjacent to an end indicator K4 after the region where the display data is located. The end indicator K4 is intended to indicate end of one frame of data. CTRL_L is intended to indicate start of each frame of data, a polarity inversion control instruction, a low-power-consumption mode, or a timing sequence of a source driver chip loading instruction. CTRL_F is intended to transmit static or dynamic parameter setting data (that is, data for setting parameters) to the source driver chip. All display data in one row of data is also called pixel data. The display data is arranged in the form of a data packet. Each display data carries one byte (ten bits) of data.

SUMMARY

Embodiments of the present disclosure provide a drive control method, a drive control apparatus, and a display device. The technical solutions are as follows:

In a first aspect of embodiments of the present disclosure, a drive control method is provided. The method is applied to a controller connected to a first driver chip, and includes:

adding at least one configuration instruction into a target region of one row of data to obtain a target row of data, wherein the target region includes at least one of a blank region and a region where display data is located; and sending the target row of data to a first driver chip, wherein the configuration instruction is intended for self-configuration of a drive parameter by the first driver chip.

Optionally, adding the at least one configuration instruction into the target region of the row of data to obtain the target row of data includes:

determining at least one region to be adjusted in the region where the display data is located; and with respect to each of the at least one region to be adjusted, adding a configuration instruction that matches the region to be adjusted to a position before and adjacent to the region to be adjusted in the target region.

Optionally, the region where the display data is located includes a plurality of sub-regions; and the determining the at least one region to be adjusted in the region where the display data is located includes:

sequentially detecting whether data in each of the sub-regions meets a parameter adjustment condition; and determining a region where data meets the parameter adjustment condition as the region to be adjusted.

Optionally, the parameter adjustment condition is an overdrive condition; and the configuration instruction is an overdrive configuration instruction; wherein the overdrive configuration instruction is intended to instruct the first driver chip to perform at least one parameter configuration operation of impedance adjustment and signal swing adjustment; and before sending the target row of data to the first driver chip, the method further includes: replacing data in the region to be adjusted with overdrive data.

Optionally, the parameter adjustment condition is an overdrive condition; and the configuration instruction is an overdrive configuration instruction, wherein the overdrive configuration instruction is intended to instruct the first driver chip to adjust a drive current.

Optionally, the controller is connected to a plurality of driver chips by data lines, wherein a switch is disposed between a data line connected to the first driver chip and a data line connected to a second driver chip, and the second driver chip is one driver chip, adjacent to the first driver chip, in the plurality of driver chips, the parameter adjustment condition is a charge-sharing condition, and the configuration instruction is a charge-sharing instruction; or the first driver chip is a source driver chip of a liquid crystal display screen, the parameter adjustment condition is a polarity inversion condition, and the configuration instruction is a polarity inversion instruction.

Optionally, determining the at least one region to be adjusted in the region where the display data is located includes:

if one piece of data in the region where the display data is located corresponds to a charging-current rise phase, determining the region where the piece of data is located as a region to be adjusted, wherein the configuration instruction is a charging-current increase instruction; and/or if another piece of data in the region where the display data is located corresponds to a charging-current retention phase or a charging-current drop phase, determining the region where another piece of data is located as a region to be adjusted, wherein the configuration instruction is a charging-current decrease instruction.

Optionally, adding the at least one configuration instruction into the target region of the row of data to obtain the target row of data includes:

adding at least one configuration set into the target region of the row of data to obtain the target row of data;

wherein each of the at least one configuration set includes the configuration instruction and an instruction identifier adjacent to and before or after the configuration instruction, wherein the instruction identifier is intended to indicate a position of the configuration instruction.

Optionally, each of at least one instruction identifier is constituted by at least two different K-codes.

In a second aspect of embodiments of the present disclosure, a drive control method is provided. The method is applied to a first driver chip, and includes:

receiving a target row of data sent by a controller, wherein the target row of data is row data obtained by adding, by the controller, at least one configuration instruction into a target region of one row of data, the target region including at least one of a blank region and a region where display data is located;

self-configuring a drive parameter based on the configuration instruction of the target row of data, and driving a display panel based on display data of the target row of data.

Optionally, the region where the display data is located includes a plurality of sub-regions; and self-configuring the drive parameter based on the configuration instruction of the target row of data includes:

with respect to each of the sub-regions, if a configuration instruction is located before and adjacent to the sub-region in the target region, self-configuring a drive parameter based on the configuration instruction.

Optionally, the method further includes:

restoring its own drive parameter to an initial drive parameter after self-configuring the drive parameter based on the configuration instruction and driving the display panel based on the data in the sub-region each time.

Optionally, self-configuring the drive parameter based on the configuration instruction includes:

performing at least one parameter configuration operation of impedance adjustment and signal swing adjustment if the configuration instruction is an overdrive configuration instruction; or adjusting a drive voltage if the configuration instruction is an overdrive configuration instruction; or controlling a switch to be turned on if the configuration instruction is a charge-sharing instruction, wherein the controller is connected to a plurality of driver chips by data lines, and the switch is disposed between a data line connected to the first driver chip and a data line connected to a second driver chip, the second driver chip being one driver chip, adjacent to the first driver chip, in the plurality of driver chips; or reversing a direction of an electric field loaded into a liquid crystal layer if the configuration instruction is a polarity inversion instruction, wherein the first driver chip is a source driver chip of a liquid crystal display screen.

Optionally, self-configuring the drive parameter based on the configuration instruction of the target row of data includes:

increasing a drive current of the first driver chip if a charging-current increase instruction is detected in the target row of data; and decreasing the drive current of the first driver chip if a charging-current decrease instruction is detected in the target row of data.

Optionally, after receiving the target row of data sent by the controller, the method further includes:

each time one instruction identifier is detected, determining an instruction adjacent to and after or before the instruction identifier as a configuration instruction, wherein the instruction identifier is intended to indicate a position of the configuration instruction.

Optionally, each of the at least one instruction identifier is constituted by at least two different K-codes.

In a third aspect of embodiments of the present disclosure, a drive control apparatus is provided. The device is applied to a controller, and includes:

an adding module, operable to add at least one configuration instruction into a target region of one row of data to obtain a target row of data, wherein the configuration instruction is intended for self-configuration of a drive parameter by a first driver chip, and the target region includes at least one of a blank region and a region where display data is located; and a sending module, operable to send the target row of data to the first driver chip.

Optionally, the adding module includes:

a determining sub-module, operable to determine at least one region to be adjusted in the region where the display data is located; and an adding sub-module, operable to, with respect to each of the regions to be adjusted, add a configuration instruction that matches the region to be adjusted to a position before and adjacent to the region to be adjusted in the target region.

Optionally, the region where the display data is located includes a plurality of sub-regions; and the determining sub-module is operable to:

sequentially detect whether data in each of the sub-regions meets a parameter adjustment condition; and determine a region whose data meets the parameter adjustment condition as the region to be adjusted.

Optionally, the parameter adjustment condition is an overdrive condition, and the configuration instruction is an overdrive configuration instruction, the overdrive configuration instruction being intended to instruct the first driver chip to perform at least one parameter configuration operation of impedance adjustment and signal swing adjustment; and the drive control apparatus further includes:

a replacing module, operable to replace data in the region to be adjusted with overdrive data before the target row of data is sent to the first driver chip.

Optionally, the parameter adjustment condition is an overdrive condition, and the configuration instruction is an overdrive configuration instruction, wherein the overdrive configuration instruction is intended to instruct the first driver chip to adjust a drive current.

Optionally, the controller is connected to a plurality of driver chips by data lines, a switch being disposed between a data line connected to the first driver chip and a data line connected to a second driver chip, wherein the second driver chip is one driver chip, adjacent to the first driver chip, in the plurality of driver chips, the parameter adjustment condition is a charge-sharing condition, and the configuration instruction is a charge-sharing instruction; or the first driver chip is a source driver chip of a liquid crystal display screen, the parameter adjustment condition is a polarity inversion condition, and the configuration instruction is a polarity inversion instruction.

Optionally, the determining sub-module is operable to:

if one piece of data in the region where the display data is located corresponds to a charging-current rise phase, determine the region where the piece of data is located as a region to be adjusted, wherein the configuration instruction is a charging-current increase instruction; and/or if another piece of data in the region where the display data is located corresponds to a charging-current retention phase or a charging-current drop phase, determine the region where another piece of data is located as a region to be adjusted, wherein the configuration instruction is a charging-current decrease instruction.

Optionally, the adding module is operable to:

add at least one configuration set into the target region of the row of data to obtain the target row of data;

wherein each of the at least one configuration set includes the configuration instruction and an instruction identifier adjacent to and before or after the configuration instruction, the instruction identifier being intended to indicate a position of the configuration instruction.

Optionally, each of the instruction identifiers is constituted by at least two different K-codes.

In a fourth aspect of embodiments of the present disclosure, a drive control apparatus is provided. The drive control apparatus is applied to a first driver chip, and includes:

a receiving module, operable to receive a target row of data sent by a controller, wherein the target row of data is row data obtained by adding, by the controller, at least one configuration instruction into a target region of one row of data, and the target region includes at least one of a blank region and a region where display data is located;

an executing module, operable to self-configure a drive parameter based on the configuration instruction of the target row of data, and drive a display panel based on display data of the target row of data.

Optionally, the region where the display data is located includes a plurality of sub-regions; and the executing module is operable to:

with respect to each of the sub-regions, when a configuration instruction is configured in a position before and adjacent to the sub-region in the target region, self-configure a drive parameter based on the configuration instruction.

Optionally, the drive control apparatus further includes:

a restoring module, operable to, after self-configuring the drive parameter based on the configuration instruction and driving the display panel based on the data in the sub-region each time, restore the drive parameter thereof to an initial drive parameter.

Optionally, the executing module is operable to perform at least one parameter configuration operation of impedance adjustment and signal swing adjustment when the configuration instruction is an overdrive configuration instruction; or adjust a drive voltage if the configuration instruction is an overdrive configuration instruction; or control a switch to be turned on if the configuration instruction is a charge-sharing instruction, wherein the controller is connected to a plurality of driver chips by data lines, the switch is disposed between a data line connected to the first driver chip and a data line connected to a second driver chip, and the second driver chip is one driver chip, adjacent to the first driver chip, in the plurality of driver chips; or reverse a direction of an electric field loaded into a liquid crystal layer when the configuration instruction is a polarity inversion instruction, wherein the first driver chip is a source driver chip of a liquid crystal display screen.

Optionally, the executing module is operable to: increase a drive current of the first driver chip when a charging-current increase instruction is detected in the target row of data; and decrease the drive current of the first driver chip when a charging-current decrease instruction is detected in the target row of data.

Optionally, the drive control apparatus further includes:

a determining module, operable to, after receiving of the target row of data sent by the controller and each detection of one instruction identifier, determine an instruction adjacent to and after or before the instruction identifier as a configuration instruction, wherein the instruction identifier is intended to indicate a position of the configuration instruction.

Optionally, each of the at least one instruction identifier is constituted by at least two different K-codes.

In a fifth aspect of embodiments of the present disclosure, a drive control apparatus is provided. The drive control apparatus is applied to a controller connected to a first driver chip, and includes:

a processor; and a memory operable to store at least one instruction executable by the processor, wherein the processor is operable to perform any one of the drive control methods as defined in the first aspect.

In a sixth aspect of embodiments of the present disclosure, a drive control apparatus is provided. The drive control apparatus is applied to a controller connected to a first driver chip, and includes:

a processor; and a memory operable to store at least one instruction executable by the processor;

wherein the processor is operable to perform any one of the drive control methods as defined in the second aspect.

In a seventh aspect of embodiments of the present disclosure, a display device is provided. The display device includes a controller and a plurality of driver chips, wherein the controller includes the drive control apparatus as defined in the third aspect, and the plurality of driver chips include the drive control apparatus as defined in the fourth aspect.

In an eighth aspect of embodiments of the present disclosure, a display device is provided. The display device includes a controller and a plurality of driver chips. The controller includes the drive control apparatus as defined in the fifth aspect. The plurality of driver chips include the drive control apparatus as defined in the sixth aspect.

Optionally, the controller includes a first processor and a first memory operable to store at least one instruction executable by the first processor; wherein the first processor is operable to:

add at least one configuration instruction in a target region of one row of data to obtain a target row of data, wherein the target region includes at least one of a blank region and a region where display data is located; and send the target row of data to a first driver chip, wherein the configuration instruction is intended to for self-configuration of a drive parameter by the first driver chip.

Optionally, the driver chip includes a second processor and a second memory operable to store at least one instruction executable by the second processor; wherein the second processor is operable to:

receive a target row of data sent by the controller, wherein the target row of data is a row of data obtained by adding by the controller at least one configuration instruction in a target region of one row of data, the target region including at least one of a blank region and a region where display data is located; and self-configure a drive parameter for the first diver chip based on the configuration instruction for the target row of data, and drive a display panel based on display data of the target row of data.

In a ninth aspect of embodiments of the present disclosure, a computer-readable storage medium with at least one instruction stored therein is provided. The at least one instruction, when running on a processing component, may cause the processing component to perform any drive control method as defined in the first aspect; or may cause the processing component to perform any drive control method as defined in the second aspect.

In a tenth aspect of embodiments of the present disclosure, a computer program product with at least one instruction stored therein is provided. The instruction program product, when running on a computer, may cause the computer to perform any drive control method as defined in the first aspect; or may cause the computer to perform any drive control method as defined in the second aspect.

In an eleventh aspect of embodiments of the present disclosure, a chip including a programmable logic circuit and/or a program instruction is provided. The chip, when running, may implement any drive control method as defined in the first aspect or the second aspect.

It is to be understood that both the above general descriptions and the following detailed descriptions are exemplary and explanatory only and are not intended to limit the present disclosure.

BRIEF DESCRIPTION OF THE DRAWINGS

For clearer descriptions of the technical solutions in the embodiments of the present disclosure, the accompanying drawings required for describing the embodiments are described hereinafter briefly. Apparently, the accompanying drawings in the following descriptions show merely some embodiments of the present disclosure, and a person of ordinary skill in the art may also derive other drawings from these accompanying drawings without creative efforts.

The accompanying drawings, which are incorporated in and constitute part of this description, illustrate embodiments consistent with the present disclosure and, together with the description, serve to explain the principles of the present disclosure.

DETAILED DESCRIPTION

In order to describe the technical solutions and principles in the embodiments of the present more clearly, the present disclosure will be described in further detail below in combination with the accompanying drawings. Apparently, the described embodiments are merely some embodiments, rather than all embodiments, of the present disclosure. Based on the embodiments of the present disclosure, all other embodiments derived by a person of ordinary skill in the art without creative efforts shall fall within the protection scope of the present disclosure.

Figure 1:
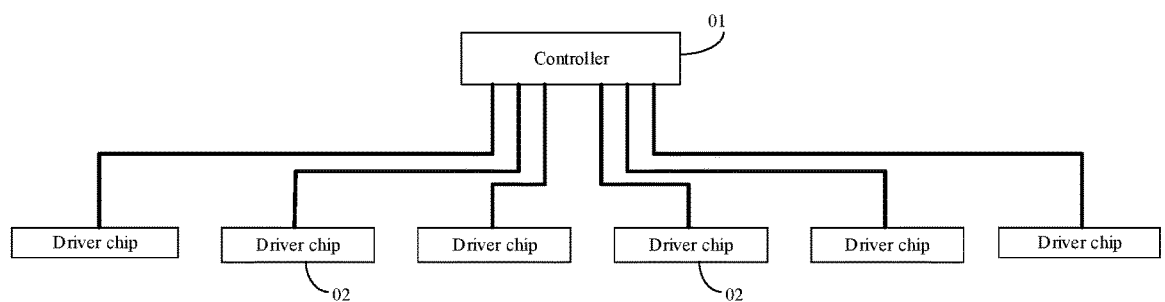
FIG. 1 is a schematic diagram of an application environment of a drive control method according to one embodiment of the present disclosure.

Referring to FIG. 1, a schematic diagram of an application environment of a drive control method according to one embodiment of the present disclosure is illustrated. As illustrated in FIG. 1, the drive control method is applied to a display device. The display device includes a controller 01 and a plurality of driver chips 02 in communication connection with the controller 01.

Figure 2:
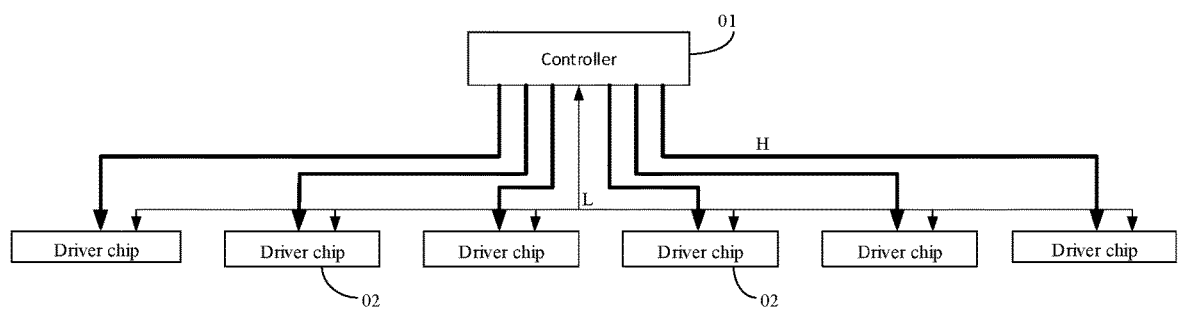
FIG. 2 is a schematic diagram of another application environment of a drive control method according to one embodiment of the present disclosure.

Optionally, referring to FIG. 2, a schematic diagram of another application environment of a drive control method according to one embodiment of the present disclosure is illustrated. As illustrated in FIG. 2, the display device includes a controller 01 and a plurality of driver chips 02 in one-to-one corresponding connection with the plurality of driver chips 02 by a plurality of first signal lines H. The controller is further connected to a second signal line L (there is generally one second signal line L). The plurality of driver chips 02 are connected in parallel and are also connected to the second signal line L. The first signal line may be a high-speed signal line, and the second signal line may be a low-speed signal line. That is, the first signal line has a higher signal transmission rate than the second signal line. For example, the first signal line is a differential signal line, and the second signal line is a common signal line. In an optional mode of this embodiment, the controller 01 may be a timing controller or System on Chip (SOC), and the driver chip 02 may be a source driver chip.

In a traditional panel driving circuit of a display device, the second signal line L may only identify a level state. For example, a pin of the source driver chip is set to be a high level or low level by the second signal line L.

However, in this embodiment, in addition to identification of the level state, the second signal line L may transmit other instructions to achieve different driving control functions, each of which corresponds to at least one transmission mode. For example, the controller may achieve the function of sending a broadcast configuration instruction to a driver by the second signal line, and this function corresponds to a broadcast mode. That is, the broadcast mode instructs the controller to broadcast data. The controller may also send an identity configuration instruction to the driver by the second signal line to achieve the function of sending an identification (ID) to the driver, and this function corresponds to an ID assignment (IA) mode. That is, the ID assignment mode instructs the controller to assign the identification of the driver. The controller may further send a point-to-point (end-to-end) configuration instruction to the driver by the second signal line to achieve the function of point-to-point control on the driver, and this function corresponds to a downstream communication (DC) mode. That is, the downstream communication mode instructs the controller to perform point-to-point driving control on the driver. The driver may send a control response instruction with respect to the point-to-point configuration instruction to the controller by the second signal line, or send an identity configuration response instruction with respect to the identity configuration instruction to the controller by the second signal line, and this function corresponds to a reply transaction (RT) mode. That is, the RT mode instructs the driver to perform instruction reply to the controller. Through cooperation between the above-mentioned modes, the controller may sequentially complete such operations on the driver as ID assignment, data reading/writing and receiving of driver data feedback, etc.

In the traditional panel driving circuit of the display device, the controller transmits a plurality of rows of data to each driver chip by the first signal line H. The plurality of rows of data is transmitted in the form of a packet. There are two types of packets, a control packet and a data packet. Each row of data includes at least one control packet and one group of continuous display data. The group of continuous display data carries display data, required by one driver chip, in one row of data. A blank region, a region not carrying data, is disposed between and intended to separate display data of every two rows of data. The control packet has two configuration instructions (also referred to as control instructions): CTRL_L and CTRL_F. CTRL_L is configured before and adjacent to a region where the display data of each row of data sent to the driver chip is located. CTRL_F is configured after a region where display data of the last row of data of each frame of data sent to the driver chip is located, and is adjacent to an end indicator K4 after the region where the display data is located. The display data in one row of data is arranged in the form of a data packet.

However, the control packet transmitted between the controller and the driver only includes a configuration instruction that may only be sent in a fixed position of each row of data. Thus, the flexibility in adding the configuration instruction is relatively lower.

Figure 3:
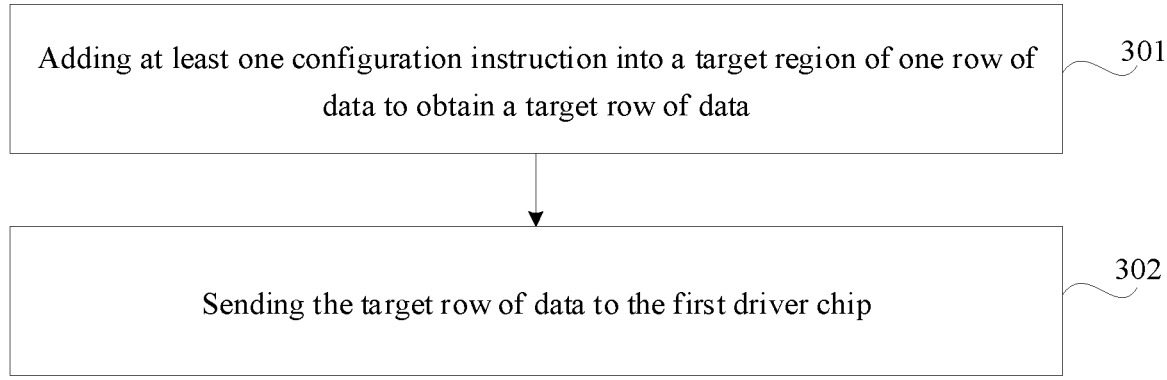
FIG. 3 is a flowchart of a drive control method according to one exemplary embodiment.

FIG. 3 is a flowchart of a drive control method according to an embodiment of the present disclosure. The drive control method is applied to a controller that may be the controller in the application scenario shown in FIG. 1 or FIG. 2. The controller is connected to a first driver chip. The first driver chip may be any one of the plurality of driver chips connected to the controller. As illustrated in FIG. 3, the drive control method includes the following steps.

In step 301, at least one configuration instruction is added into a target region of one row of data to obtain a target row of data.

The row of data described above is data to be sent to the first driver chip. The configuration instruction is configured for self-configuration of a drive parameter by the first driver chip. The target region includes at least one of a blank region and a region where display data is located. The blank region, also referred to as a horizontal blanking (H-blank), is a reserved region not carrying data. The region where the display data of one row of data is located generally refers to a region between CTRL_L and an end indicator K2 (indicating end of one row of data) or K4 (indicating end of one frame of data). Data in this region is gray-scale data actually required by the driver chip for driving the display panel to display the data.

In step 302, the target row of data is sent to the first driver chip.

For example, the target row of data is configured for self-configuration of a drive parameter by the first driver chip based on the configuration instruction and to drive the display panel based on the display data.

In the drive control method according to this embodiment, since at least one configuration instruction may be added, based on actual situations, to at least one of the blank region of one row of data and the region where the display data is located in one row of data, and the target row of data is sent to the first driver chip, compared with a method of adding a configuration instruction to a fixed position of each row of data, the method of adding the configuration instruction in this embodiment is more flexible. Thus, the flexibility in adding the configuration instruction is improved.

Figure 4:
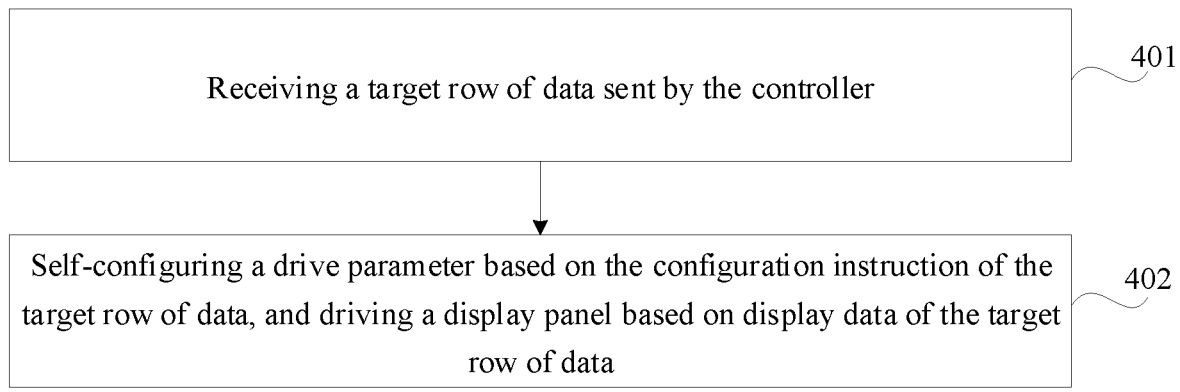
FIG. 4 is a flowchart of another drive control method according to one exemplary embodiment.

FIG. 4 is a flowchart of another drive control method according to an embodiment of the present disclosure. The drive control method is applied to a first driver chip. The first driver chip is connected to a controller. The first driver chip is any one of a plurality of driver chips that are connected to the controller. Exemplarily, the plurality of driver chips may be the plurality of driver chips in the application scenario shown in FIG. 1 or FIG. 2 and are connected to the controller. As illustrated in FIG. 4, The drive control method includes the following steps.

In step 401, a target row of data sent by the controller is received.

The target row of data is row data obtained by adding, by the controller, at least one configuration instruction into a target region of one row of data. The target region includes at least one of a blank region and a region where display data is located.

In step 402, a drive parameter is self-configured based on the configuration instruction of the target row of data, and a display panel is driven based on display data of the target row of data.

In the drive control method according to this embodiment, since the target row of data sent by the controller and received by the first driver chip is the row data obtained by adding at least one configuration instruction into the target region of one row of data, and the first driver chip may self-configure the drive parameter based on the configuration instruction of the target row of data and drive the display panel based on the display data of the target row of data, compared with a method of performing driving control based on a configuration instruction added to the fixed position of each row of data, the method of performing driving control based on the configuration instruction added to the target region in this embodiment is higher in flexibility. Thus, the flexibility in adding the configuration instruction is improved.

For ease of understanding, a data transmission principle involved in the present disclosure is introduced first. In a display device, driving data between a controller and a plurality of driver chips is transmitted frame by frame. Each frame of data includes a plurality of rows of data and is transmitted row by row. Each row of data is divided into a plurality of pieces of data allocated to the plurality of driver chips. Therefore, with respect to each row of data in one frame of data, one driver chip receives one piece of data in the row of data. Further, with respect to one frame of data, one driver chip receives data of one segment in the frame of data, and a plurality of segments obtained by dividing one frame of data correspond to the plurality of driver chips one by one. The data of one segment is a plurality of columns of data of one frame of data. In the embodiments of the present application, for one driver chip, one row of data sent to the driver chip is essentially one piece of data of one frame of data.

Figure 5:
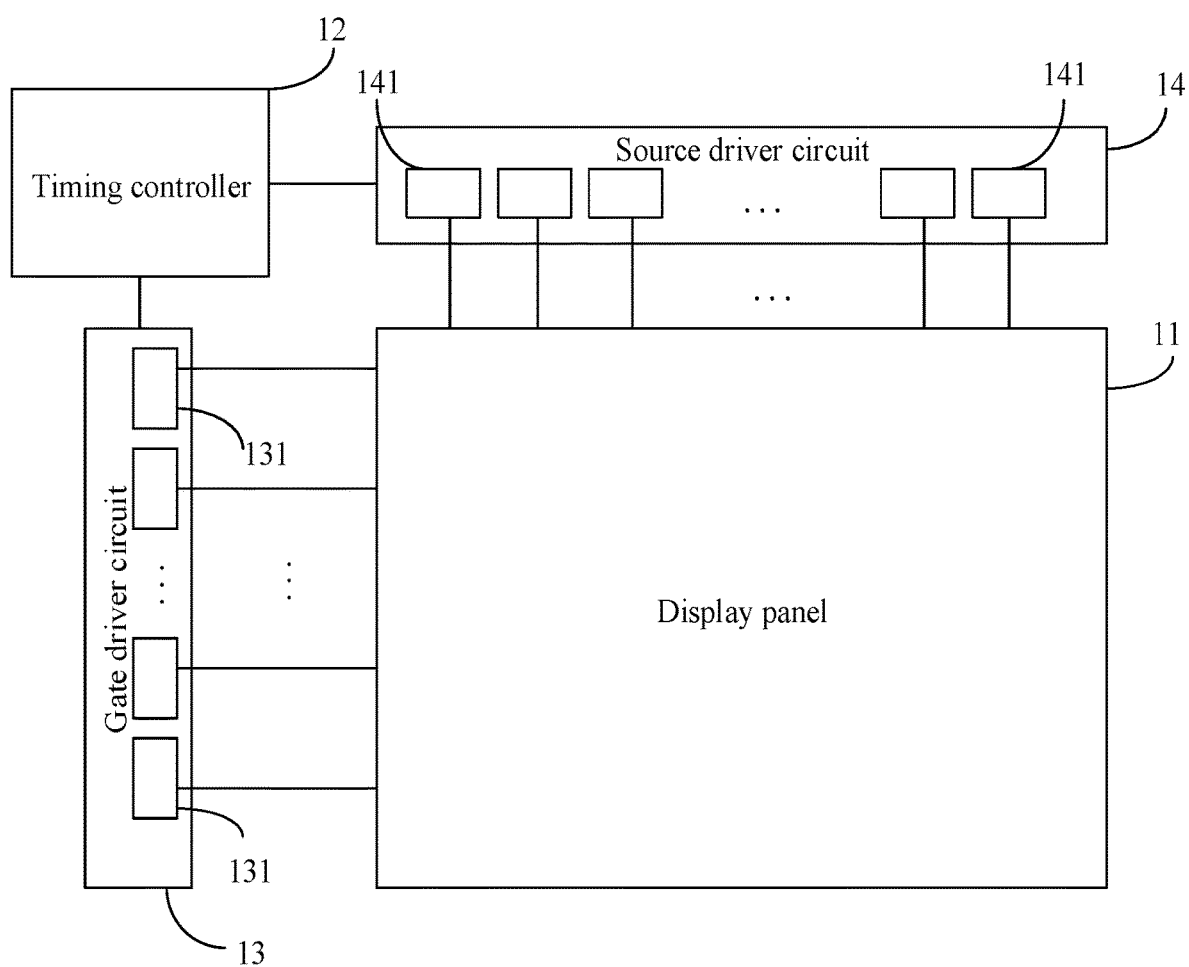
FIG. 5 is a schematic structural diagram of a display device according to one exemplary embodiment.

The case where the controller is a timing controller and the driver chip is a source driver chip is taken as an example. Referring to FIG. 5, a schematic structural diagram of a display device is illustrated. The display device may generally include a display panel 11 and a panel driving circuit for driving the display panel. The panel driving circuit may include a timing controller 12, a gate driver circuit 13 and a source driver circuit 14. The gate driver circuit 13 includes a plurality of gate driver chips 131. The source driver circuit 14 includes a plurality of source driver chips 141. The gate driver circuit 13 is operable to scan all rows of pixels in the display panel 11 row by row. The source driver circuit 14 is operable to provide data signals to each column of pixels in the display panel 11. The timing controller 12 is connected to the gate driver circuit 13 and the source driver circuit 14 and used to control (also referred to as driving control) signals output to the gate driver circuit 13 and the source driver circuit 14.

Figure 6:
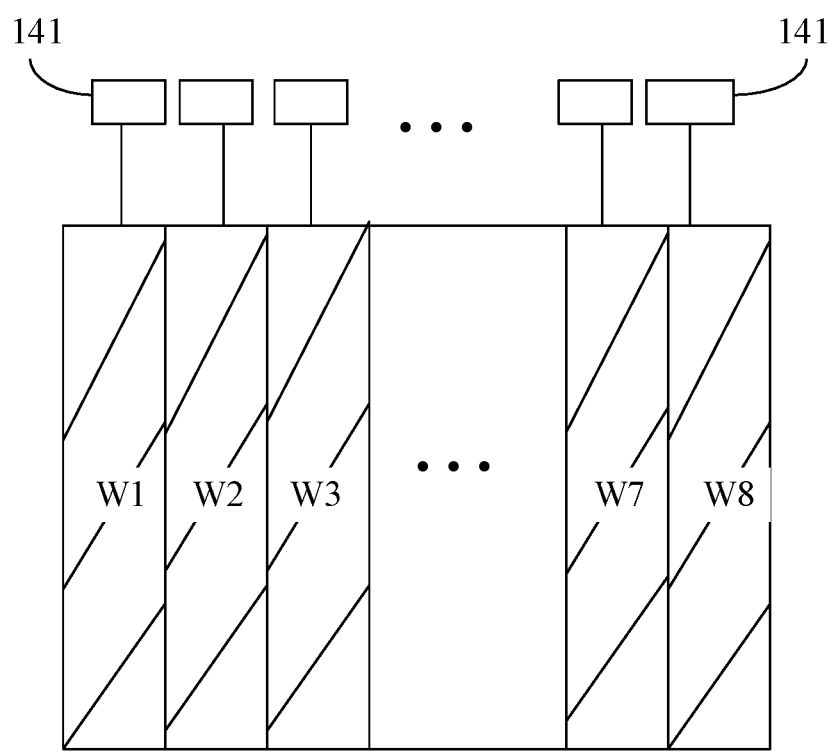
FIG. 6 is a schematic partitioning diagram of one frame of data displayed on a display panel shown in FIG. 5.

Referring to FIG. 6, a schematic partitioning diagram of one frame of data displayed on the display panel illustrated in FIG. 5 is illustrated. One frame of data may be divided into n segments according to the number n of the driver chips. The areas of the n segments are usually equal, and n is an integer greater than 1. FIG. 6 takes the case where the total number of source driver chips 141 is eight as an example for description. One frame of data is equally divided into eight segments: W1 to W8. Each segment includes a plurality of columns of data of the frame of data. For each source driver chip, one row of data received by the source driver chip is substantially one piece of data of the frame of data. For example, if the resolution of one frame of data is 3,840*2,160, namely, 3,840 columns and 2,160 rows, each segment includes 3,840/8=480 columns of data. For each source driver chip, one row of data received by the source driver chip is substantially one-eighth rows of data of the frame of data, that is, data of 480 pixels.

Figure 7:
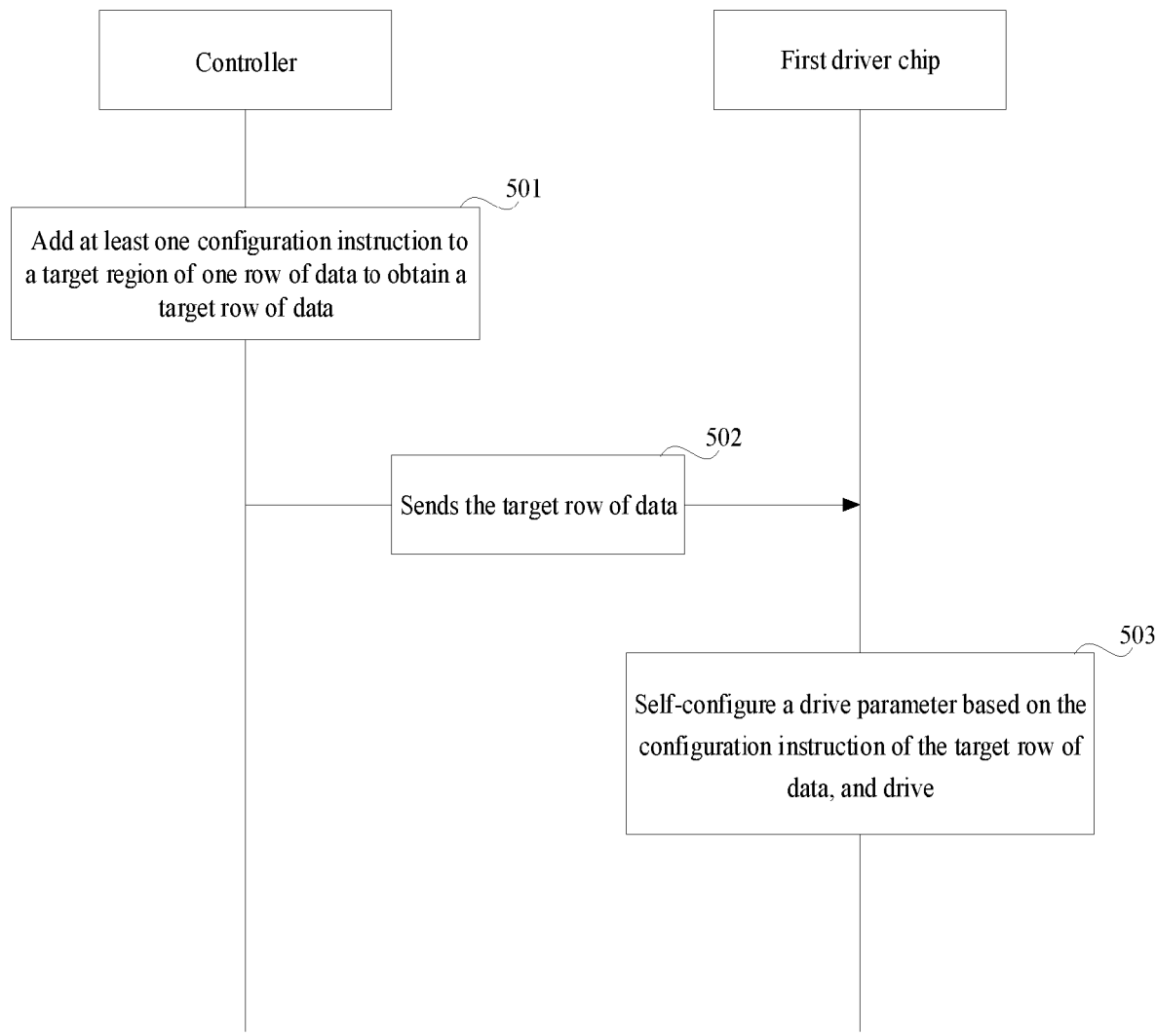
FIG. 7 is a flowchart of yet another drive control method according to one exemplary embodiment.

FIG. 7 is a flowchart of still another drive control method according to an embodiment of the present disclosure. The drive control method is applied to a display device in the application scenario shown in FIG. 1, FIG. 2 or FIG. 5. The display device includes a controller and a plurality of driver chips in communication connection with the controller. The controller may transmit data by the communication connection with the plurality of driver chips. The communication connection may be implemented by a differential signal. Exemplarily, as illustrated in FIG. 2, since a first signal line has a higher transmission rate than a second signal line, the first signal line with the relatively higher transmission rate is usually adopted to transmit the target row of data to guarantee the timeliness of driving control. Optionally, the first signal line is a differential signal line. This embodiment takes the first driver chip, which is any one of the plurality of driver chips, as an example for description. For the working process of other driver chips, reference may be made to the first driver chip. As illustrated in FIG. 7, the drive control method includes the following steps.

In step 501, the controller adds at least one configuration instruction to a target region of one row of data to obtain a target row of data.

The configuration instruction is configured for self-configuration of a drive parameter by the first driver chip. The target region includes at least one of a blank region and a region where display data is located. That is, the target region may include either the blank region or the region where the display data is located, and may also include both of the blank region and the region where the display data is located.

Figure 8:
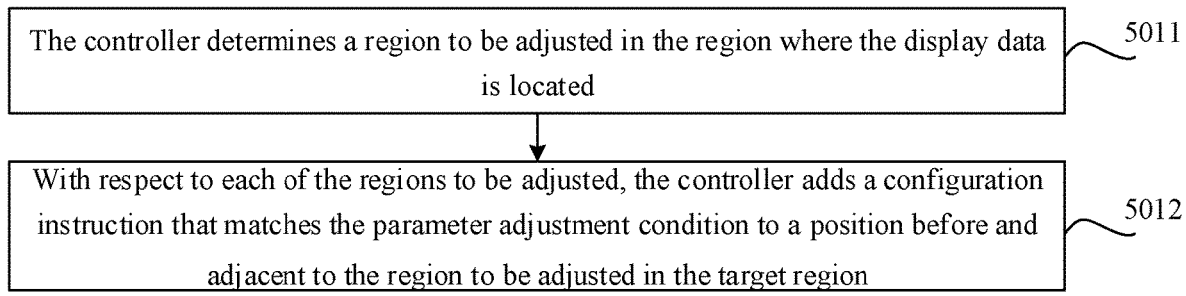
FIG. 8 is a flowchart showing that a controller acquires a target row of data according to one exemplary embodiment.

This embodiment takes transmission of one frame of data as an example for description. For transmission of other frames of data, reference may be made to the frame of data. It is assumed that the frame of data is a data frame being currently transmitted by the controller. The frame of data includes a plurality of rows of data. Each row of data includes driving data of a plurality of driver chips. The controller divides, based on the number and positions of the driver chips, the frame of data into data of a plurality of segments in one-to-one correspondence with the plurality of driver chips, and transmits data of the corresponding segment to each driver chip. Taking the first driver chip as an example, it is assumed that the segment corresponding to the first driver chip is a first segment. Then, one row of data to be sent to the first driver chip is one row of data in the first segment. For transmission of other rows of data, reference may be made to the row of data. Optionally, as illustrated in FIG. 8, step 501 includes the following steps.

In step 5011, the controller determines a region to be adjusted in the region where the display data is located.

In this embodiment, before sending each row of data of the first segment to the first driver chip, the controller needs to determine the region to be adjusted, whose data meets a parameter adjustment condition, based on the data in the first segment, and to add a corresponding configuration instruction to the target region.

In step 5012, with respect to each of the regions to be adjusted, the controller adds a configuration instruction that matches the parameter adjustment condition to a position before and adjacent to the region to be adjusted in the target region.

The controller adds the configuration instruction that matches the parameter adjustment condition to the position before and adjacent to the region to be adjusted in the target region, such that the configuration instruction is at least for the data in the region to be adjusted. That is, when the first driver chip drives the display panel based on the data in the region to be adjusted, the corresponding drive parameter has been well configured.

Optionally, step 501 may further include: adding, by the controller, at least one configuration set into the target region of one row of data to be sent to obtain the target row of data. Each configuration set includes the configuration instruction and an instruction identifier adjacent to and before and after the configuration instruction. The instruction identifier is intended to indicate a position of the configuration instruction. After receiving the target row of data, the first driver chip may find the corresponding configuration instruction based on the instruction identifier.

The instruction identifier may be constituted by at least one character, which may be a number or letter. Exemplarily, each instruction identifier may be constituted by at least two different K-codes, e.g., K1, K2, K3, and K4. Each independent K-code has a corresponding identifying meaning. For example, in this embodiment, K1 indicates start of display data of each row of data, and K2 is an end indicator indicating end of display data of each row of data. In this embodiment, each instruction identifier may be constituted by at least two different K-codes in order to be distinguished from K-codes in the related art, such that code confusion is avoided and a definite identifying role is played. For example, the instruction identifier may be K1K4 or K4K1. The instruction identifiers added into the same row of data may be identical or different, and the instruction identifiers added into different rows of data may also be identical or different, neither of which is limited in this embodiment.

In step 502, the controller sends the target row of data to the first driver chip.

As illustrated in FIG. 1 and FIG. 2, the controller may transmit the target row of data by the communication connection with the plurality of driver chips. The communication connection may be implemented by a differential signal line. Exemplarily, as illustrated in FIG. 2, the first signal lines which has a relatively higher transmission rate than the second signal line is usually adopted to transmit the target row of data to guarantee the timeliness of driving control. Optionally, the first signal line is a differential signal line.

In step 503, the first driver chip self-configures a drive parameter based on the configuration instruction of the target row of data, and drives the display panel based on display data of the target row of data.

After receiving the target row of data sent by the controller, the first driver chip needs to perform, based on the target row of data, a corresponding driving action on the display panel and a configuration action of the drive parameter (namely, execution of the configuration instruction).

In step 5011, the configuration instruction and the region to be adjusted are determined based on data content of the row of data and/or the parameter adjustment condition. With respect to the different parameter adjustment conditions and the different data contents, the determined regions to be adjusted are also different. Correspondingly, different configuration instructions may be added into one row of data. Optionally, the configuration instruction added into one row of data includes at least one of a charging-current control instruction, an overdrive (OD) instruction, a charge-sharing instruction and a polarity inversion control (POL) instruction.

In this embodiment, determining the region to be adjusted in step 5011 may be implemented in various ways. This embodiment takes the following two implementations as examples for description.

In a first implementation, the region where the display data is located includes a plurality of sub-regions. In this way, step 5011 includes: sequentially detecting by the controller whether data in each of the sub-regions meets a parameter adjustment condition; and determining a region whose data meets the parameter adjustment condition as the region to be adjusted.

The plurality of sub-regions may be obtained by the controller in a manner appointed with the first driver chip.

The lengths of the plurality of sub-regions may be equal or unequal. To simplify the division process, the lengths of the plurality of sub-regions are generally equal. The controller may sequentially traverse a plurality of sub-regions to detect whether data in each sub-region meets the parameter adjustment condition, and to determine a sub-region whose data meets the parameter adjustment condition as the region to be adjusted.

Figure 9:
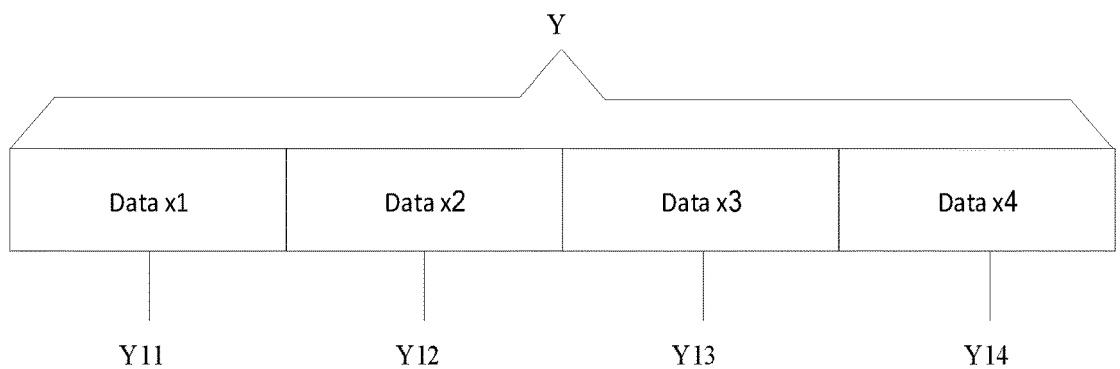
FIG. 9 is a schematic structural diagram of a region where display data is located according to one exemplary embodiment.

As illustrated in FIG. 9, which is a schematic structural diagram of a region where display data is located according to an exemplary embodiment. The region Y where the display data is located may include a plurality of sub-regions, each of which carries data. FIG. 9 takes the case where the plurality of sub-regions are Y11 to Y14 as an example for description. The plurality of sub-regions carries data x1 to x4. Generally, the data contents in the plurality of sub-regions are of the same type. For example, when the driver chip is a source driver chip, the data in the plurality of sub-regions are grayscale data. That is, each sub-region carries at least one grayscale value.

This embodiment takes the following exemplary implementation as an example to further describe the first implementation.

In a first exemplary implementation, if the display panel driven by the driver chip is a liquid crystal display panel, the display data in one frame of data includes a plurality of grayscale values. The parameter adjustment condition is an overdrive condition. The configuration instruction is an overdrive configuration instruction.

The overdrive technology is a technology commonly used by the liquid crystal display panel to shorten response time of liquid crystals. With reference to the previous frame of data of the current data frame (also referred to as the current frame of data), the controller increases or reduces an actual pixel voltage (namely, a voltage actually adopted by the driver chip to drive the display panel) of the current data frame to a certain degree in comparison with an original voltage value corresponding to the current data frame, such that quick response of the liquid crystals is realized.

Correspondingly, the overdrive condition is a condition for reflecting a large gap between row data at the same position in two consecutive frames of data corresponding to the same driver chip. That is, when the gap between the row data at the same position in two consecutive frames of data obtained by the same driver chip is large, the data meets the overdrive condition. For example, the overdrive condition is that the number of target grayscale values in a sub-region of one row of data of the first driver chip is greater than a number threshold, and the target grayscale value is a grayscale value, which has a positive difference from the grayscale value at the same position in the previous row of data and is larger than or equal to a difference threshold. In this case, the overdrive condition is called a positive overdrive condition, and the corresponding overdrive configuration instruction is a positive overdrive configuration instruction. Alternatively, the target grayscale value has a negative difference, of which the absolute value is larger than or equal to the difference threshold, from the grayscale value at the same position in the previous row of data. In this case, the overdrive condition is called a negative overdrive condition, and the corresponding overdrive configuration instruction is a negative overdrive configuration instruction. Optionally, the difference threshold is 7, and of course, it may be other values. The previous row of data is the data, in the same position as the row of data of the current data frame, of the previous frame of data.

Under this overdrive condition, the controller may perform the following processes to determine whether the data in each sub-region meets the overdrive condition.

In step A1, the controller compares the sub-region of the row of data of the first driver chip with the region in the same position as the previous row of data.

In step A2, when the number of target grayscale values in the sub-region of the row of data is greater than the number threshold, it is determined that the sub-region meets the overdrive condition, and the sub-region is determined as the region to be adjusted.

In step A3, when the number of target grayscale values in the sub-region of the row of data is not greater than the number threshold, it is determined that the sub-region does not meet the overdrive condition.

In a traditional driving control process, when the data meets the overdrive condition, the controller only needs to perform overdrive processing. The overdrive processing actually replaces the data that meets the overdrive condition with overdrive data. The driver chip drives the display panel based on the overdrive data.

In this embodiment, the overdrive process requires participation of the first driver chip. The present disclosure provides the following two exemplary overdrive methods.

In a first overdrive method, the overdrive configuration instruction is intended to instruct the first driver chip to perform at least one parameter configuration operation of impedance adjustment and signal swing adjustment. For example, when the overdrive configuration instruction is a positive overdrive configuration instruction, the overdrive configuration instruction is intended to instruct the first driver chip to perform at least one parameter configuration operation of impedance adjustment and signal swing adjustment. When the overdrive configuration instruction is a negative overdrive configuration instruction, the overdrive configuration instruction is intended to instruct the first driver chip to perform at least one parameter configuration operation of impedance adjustment and signal swing adjustment. Further, after the region to be adjusted is determined, the controller may also replace the data in the region to be adjusted with overdrive data.

The above case where the data in the region to be adjusted is adjusted to overdrive data refers to that the data in the region to be adjusted is correspondingly adjusted to overdrive data one by one. For example, the data in the region to be adjusted includes a plurality of grayscale values in one-to-one correspondence with a plurality of pixels. Correspondingly, the case where the data in the region to be adjusted is adjusted to overdrive data refers to that each grayscale value in the region to be adjusted is adjusted to a grayscale value corresponding to the same pixel in the overdrive data.

The overdrive data is data subjected to overdrive processing, and it may be pre-configured data (namely, data configured before step 501), and may also be calculated or queried based on a preset condition (namely, a condition set before step 501). Exemplarily, the region to be adjusted may be determined in the region where the display data of one row of data is located by querying a correspondence table. After that, the data in the region to be adjusted is adjusted to overdrive data.

For example, the data carried in each sub-region includes at least one grayscale value in one-to-one correspondence with at least one pixel. The correspondence table of positive overdrive may be as illustrated in Table 1, and records the grayscale values subjected to positive overdrive and corresponding to all possible grayscale values in two rows of data from two adjacent frames of data corresponding to the same driver chip. Table 1 merely schematically shows part of the content in the correspondence table. It is assumed that the two rows of data are all possible grayscale values of the Pth-row data of the (N−1)th-frame data and all possible grayscale values of the Pth-row data of the Nth-frame data, N is an integer greater than 1, and P is a positive integer. The region to be adjusted is obtained by comparing the Pth-row data of the Nth-frame data with the Pth-row data of the (N−1)th-frame data. It is assumed that in step A2, the number threshold of the target grayscale value is 0. That is, the sub-region is the region to be adjusted as long as the sub-region has one target grayscale value. During query of Table 1, the grayscale values of all the sub-regions are traversed sequentially. For each grayscale value, the grayscale value is adopted to query the Pth-row data of the Nth-frame data in the correspondence table, and a grayscale value in the same position as the foregoing grayscale value in the previous row of data is adopted to query the Pth-row data of the (N−1)th-frame data in the correspondence table to obtain the target grayscale value. When the target grayscale value is the same as the original grayscale value, it means that the original grayscale value does not need to be adjusted. When the target grayscale value is different from the original grayscale value, it indicates that the original grayscale value needs to be adjusted.

That is, when the grayscale value in a certain sub-region at the same position as the sub-region in the previous row of data meets the following condition: the difference between the grayscale values corresponding to the same pixel is positive, and is greater than or equal to the difference threshold, the grayscale value (namely, the grayscale value obtained by looking up the table) in the certain sub-region is adjusted to the grayscale value in the overdrive data. When the grayscale value in a certain sub-region at the same position as the sub-region in the previous row of data does not meet the following condition: the difference between the grayscale values corresponding to the same pixel is positive and is greater than or equal to the difference threshold, the grayscale value in the certain sub-region is the same as the grayscale value in the overdrive data. That is, the grayscale value does not change.

Exemplarily, as illustrated in Table 1, when the grayscale values corresponding to the same pixel in the Pth-row data of the Nth-frame data and the Pth-row data of the (N−1)th-frame data are 0, the corresponding target grayscale value is 0, that is, the grayscale value does not change. When the grayscale values corresponding to the same pixel in the Pth-row data of the Nth-frame data and the Pth-row data of the (N−1)th-frame data are 7 and 0 respectively, the corresponding target gray level value is 17, that is, the grayscale value increases, which meets the positive overdrive condition. The sub-region in this case is the region to be adjusted.

It is assumed that the first driver chip is a source driver chip, the grayscale values in one sub-region of the first driver chip are 7, 15 and 23, and the grayscale values in the sub-region at the same position in the previous row of data are 0, 15 and 31, by looking up Table 1, the differences between the grayscale values corresponding to the same pixel are 7, 0, and −8 respectively. A positive value of 7 equal to the difference threshold is provided, such that the sub-region is the target sub-region, and the overdrive data is 17, 15 and 23.

TABLE 1

| Target grayscale value | $P^{th}$-row data of $N^{th}$-frame data | | | | | | | | |
|---|---|---|---|---|---|---|---|---|---|
| | 0 | 7 | 15 | 23 | 31 | 39 | 47 | 55 | 63 |
| $P^{th}$-row data of $(N-1)^{th}$-frame data   0 | 0 | 17 | 33 | 44 | 49 | 53 | 57 | 61 | 63 |
| 7 | 0 | 7 | 28 | 37 | 44 | 49 | 53 | 57 | 63 |
| 15 | 0 | 7 | 15 | 29 | 39 | 45 | 53 | 57 | 63 |
| 23 | 0 | 7 | 15 | 23 | 35 | 43 | 52 | 57 | 63 |
| 31 | 0 | 7 | 15 | 23 | 31 | 44 | 52 | 57 | 63 |
| 39 | 0 | 7 | 15 | 23 | 31 | 39 | 49 | 57 | 63 |
| 47 | 0 | 7 | 15 | 23 | 31 | 39 | 47 | 56 | 63 |
| 55 | 0 | 7 | 15 | 23 | 31 | 39 | 47 | 55 | 63 |
| 63 | 0 | 7 | 15 | 23 | 31 | 39 | 47 | 55 | 63 |

A correspondence table of negative overdrive records the grayscale values subjected to negative overdrive and corresponding to all possible grayscale values in two rows of data from two adjacent frames of data corresponding to the same driver chip. It is assumed that in step A2, the number threshold of the target grayscale value is 0. That is, the sub-region is the target grayscale value as long as the sub-region has one target grayscale value. Reference may be made to the query method of the correspondence table of positive overdrive for a query method of the correspondence table of negative overdrive, which is not further described in this embodiment. That is, if the grayscale value in a certain sub-region at the same position as the sub-region in the previous row of data meets the following condition: the difference between the grayscale values corresponding to the same pixel is negative and the absolute value of difference is greater than or equal to the difference threshold, the grayscale value (namely, the grayscale value obtained by looking up the table) in the certain sub-region is adjusted to the grayscale value in the overdrive data. If the grayscale value in a certain sub-region at the same position as the sub-region in the previous row of data does not meet the following condition: the difference between the grayscale values corresponding to the same pixel is negative and the absolute value of the difference is greater than or equal to the difference threshold, the grayscale value in the certain sub-region is the same as the grayscale value in the overdrive data. That is, the grayscale value does not change.

In an optional implementation, this embodiment further provides a general overdrive table, which is a general table of the correspondence table of positive overdrive and the correspondence table of negative overdrive. When it is concluded by query based on the general overdrive table that one sub-region in the region where the display data of one row of data is located meets the positive overdrive condition and the other region meets the negative overdrive condition, the two regions are the region to be adjusted.

The general overdrive table may be as illustrated in Table 2, which records the grayscale values subjected to overdrive and corresponding to all possible grayscale levels in two rows of data from two adjacent frames of data corresponding to the same driver chip. Table 2 merely schematically shows part of the content in the general overdrive table. It is assumed that the two rows of data to be executed are all possible grayscale values of Qth-row data of (N−1)th-frame data and all possible grayscale values of the Qth-row data of Nth-frame data, N is an integer greater than 1, and Q is a positive integer. The region to be adjusted is obtained by comparing the Qth-row data of the Nth-frame data with the Qth-row data of the (N−1)th-frame data. It is assumed that in step A2, the number threshold of the target grayscale value is 0. That is, the sub-region is the region to be adjusted as long as the sub-region has one target grayscale value. Thus, the query method of Table 2 is consistent with that of Table 1, and is not described herein any further in this embodiment.

It is assumed that the first driver chip is a source driver chip, the grayscale values in one sub-region of the first driver chip are 7, 15, and 23 respectively, and the grayscale values in the sub-region at the same position in the previous row of data are 0, 15, and 31 respectively, by looking up Table 2, the difference between the grayscale values corresponding to the same pixel is 7, 0, and −8 respectively. There is a positive value of 7 equal to the difference threshold, and −8 is a negative value of which the absolute value is larger than the difference threshold, such that the sub-region is the region to be adjusted, and the overdrive data is 17, 15, and 14 respectively.

TABLE 2

| Target grayscale value | $Q^{th}$-row data of $N^{th}$-frame data | | | | | | | | |
|---|---|---|---|---|---|---|---|---|---|
| | 0 | 7 | 15 | 23 | 31 | 39 | 47 | 55 | 63 |
| $Q^{th}$-row data of $(N-1)^{th}$-frame data   0 | 0 | 17 | 33 | 44 | 49 | 53 | 57 | 61 | 63 |
| 7 | 0 | 7 | 28 | 37 | 44 | 49 | 53 | 57 | 63 |
| 15 | 0 | 6 | 15 | 29 | 39 | 45 | 53 | 57 | 63 |
| 23 | 0 | 6 | 9 | 23 | 35 | 43 | 52 | 57 | 63 |
| 31 | 0 | 0 | 3 | 14 | 31 | 44 | 52 | 57 | 63 |
| 39 | 0 | 0 | 2 | 11 | 27 | 39 | 49 | 57 | 63 |
| 47 | 0 | 0 | 2 | 10 | 23 | 35 | 47 | 56 | 63 |
| 55 | 0 | 0 | 1 | 6 | 19 | 33 | 44 | 55 | 63 |
| 63 | 0 | 0 | 0 | 2 | 14 | 28 | 41 | 52 | 63 |

In a first overdrive mode, the controller performs overdrive processing, and the first driver chip performs parameter configuration operations. Through cooperation of both parties, more accurate overdrive control may be achieved.

It should be noted that in the first overdrive method described above, the controller directly replaces the data of the region to be adjusted that requires overdrive with overdrive data as an example before the controller transmits data. After receiving the overdrive data, the source driver chip drives the display panel based on the overdrive data to realize overdrive. In fact, the controller may perform overdrive by the corresponding source driver chip without changing the data of the region to be adjusted. For example, after receiving the target row of data, the first driver chip x1 may query Table 1 or Table 2 to obtain the corresponding overdrive data, and then drive the display panel based on the overdrive data. For details about this process, reference may be made to the above embodiment, which are not described herein in the present disclosure.

In a second overdrive mode, the parameter adjustment condition is an overdrive condition, the configuration instruction is an overdrive configuration instruction, and the overdrive configuration instruction is intended to instruct the first driver chip to adjust a drive voltage. Exemplarily, if the overdrive configuration instruction is a positive overdrive configuration instruction, the instruction is intended to instruct the first driver chip to increase the drive voltage. If the overdrive configuration instruction is a negative overdrive configuration instruction, the instruction is intended instruct the first driver chip to decrease the drive voltage.

The degree of adjustment of the drive voltage, indicated by the overdrive configuration instruction, or the target drive voltage reached by the adjustment may be predetermined by the controller and the driver chip, or may be carried in the overdrive configuration instruction. Exemplarily, the controller and the first driver chip may preset a plurality of drive voltage gears, and the drive voltage corresponding to each drive voltage gear is a set percentage of an initial drive voltage (namely, a normal working voltage pre-configured in the first driver chip). The set percentage ranges from 10% to 150%. For example, it is assumed that the initial drive voltage V1 is 5V, and 4 drive voltage gears are provided, namely 50% V1, 80% V1, 100% V1, and 120% V1. The controller carries the target drive voltage gear in the overdrive configuration instruction for the first driver chip to adjust its own drive voltage gear to the target drive voltage gear; or the controller carries a gear adjustment indication in the overdrive configuration instruction. This gear adjustment indication is intended to indicate upshift or downshift.

In a second overdrive mode, the controller does not need to adjust the data in the region to be adjusted but only needs to determine the region to be adjusted that meets the overdrive condition and to add a corresponding overdrive configuration instruction. The first driver chip achieves an overdrive effect by adjusting the drive voltage. Thus, the computational cost of the controller is lowered.

In a second exemplary implementation, the controller is connected to a plurality of driver chips by data lines. A switch is disposed between the data line connected to the first driver chip and the data line connected to the second driver chip. The second driver chip is a driver chip adjacent to the first driver chip in the plurality of driver chips. The parameter adjustment condition is a charge-sharing condition. The configuration instruction is a charge-sharing instruction. The charge-sharing instruction is intended to instruct the first driver chip to control the switch to be turned on.

The charge-sharing technology refers to a technology in which a switch is disposed between output ends of two adjacent data lines (the two data lines are respectively connected to two adjacent driver chips). Owing to different charge polarities of the two adjacent data lines, when the switch is turned on, positive and negative charges at the output ends of the two data lines are neutralized, such that the output current and the energy consumption may be reduced. The switch may be a metal oxide semiconductor (MOS) transistor and may be controlled by the controller via a charge-sharing instruction.

In this embodiment, the charge-sharing condition is a preset condition (that is, it is set in the driver before the driver is powered on or before the current time) representing that the energy consumption needs to be reduced. For example, the charge-sharing condition is that the display panel is adjusted to a low-power-consumption mode. For another example, the charge-sharing condition is that the power consumption corresponding to the data in the current sub-region is high (that is, the power consumption is greater than a power consumption threshold). For yet another example, the charge-sharing condition is receiving of an instruction indicating that the power consumption needs to be reduced.

In a third exemplary implementation, the first driver chip is a source driver chip of a liquid crystal display panel. The parameter adjustment condition is a polarity inversion condition. The configuration instruction is a polarity inversion instruction. The polarity inversion instruction is intended to instruct the first driver chip to reverse a direction of an electric field loaded into a liquid crystal layer.

For the liquid crystal display panel, the electric field loaded onto liquid crystals has a polarity. In different time periods, loading electric fields in opposite directions onto the liquid crystals is called polarity inversion (or polarity reversal). Polarity inversion may be used for eliminating a residual image caused by long-term DC bias of the liquid crystals. A polarity inversion condition is a preset condition (that is, it is set in the driver before the driver is powered on or before the current time) representing that the energy consumption needs to be reduced. For example, the polarity inversion condition is that a duration of DC bias voltage of the liquid crystals reaches a duration threshold. For another example, the polarity inversion condition is that the moment at which the display panel is driven based on a certain grayscale value reaches a specified polarity inversion cycle. For yet another example, the polarity inversion condition is receiving of an instruction indicating that polarity inversion is required.

Figure 10:
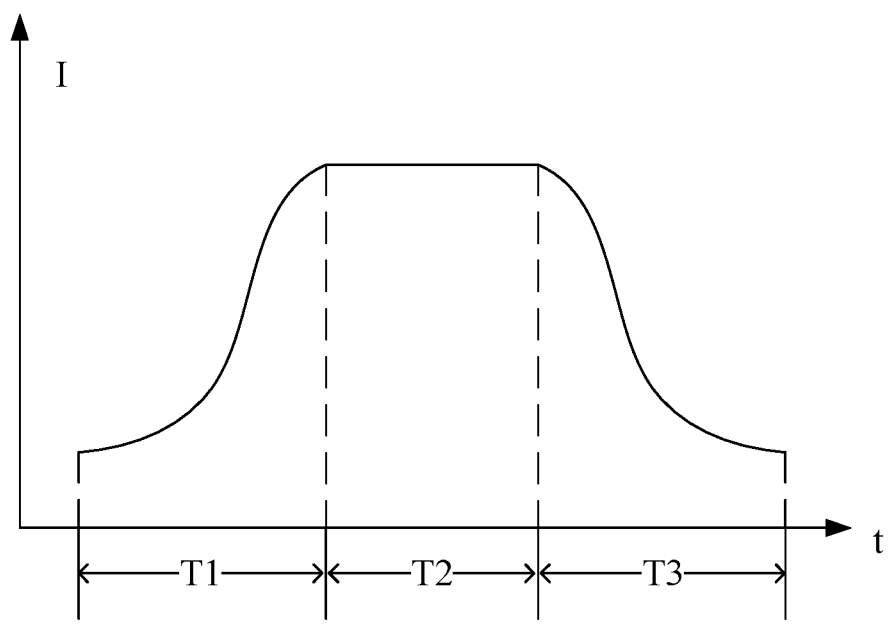
FIG. 10 is a schematic diagram showing a driving control process of a panel driving circuit according to one exemplary embodiment.

In a second implementation, referring to FIG. 5, during the driving control process of a panel driving circuit by the timing controller 12, changes of the charging current (also referred to as drive current) loaded onto the pixel are divided into three phases, as illustrated in FIG. 10, including a charging-current rise phase T1, a charging-current retention phase T2 and a charging-current decrease phase T3. In FIG. 10, the horizontal axis t represents time, and the vertical axis I represents current intensity. In this embodiment, if the driver chip is a source driver chip, a configuration instruction may be added according to different charging-current phases corresponding to the display data. Accordingly, step 5011 includes the following steps.

In step B1, if one piece of data in the region where the display data is located corresponds to the charging-current rise phase, the region where the piece of data is located is determined as the region to be adjusted. The corresponding configuration instruction is a charging-current increase instruction intended to instruct increase of the drive current of the first driver chip.

In step B2, if another piece of data in the region where the display data is located corresponds to the charging-current retention phase or the charging-current decrease phase, the region where another piece of data is located is determined as the region to be adjusted. The corresponding configuration instruction is a charging-current decrease instruction intended to instruct decrease of the drive current of the first driver chip.

The charging-current increase instruction and the charging-current decrease instruction in step B1 and step B2 may be collectively referred to as a charging-current control instruction. In step B1, the increase degree of current or a target current reached by increase of current may be predetermined by the controller and the driver chip, or may be carried in the charging-current increase instruction, which will not be limited by this embodiment. In step B2, the decrease degree of current or a target current reached by decrease of the current may be predetermined by the controller and the driver chip, or may be carried in the charging-current decrease instruction, which will not be limited by this embodiment.

In this embodiment, the configuration instructions are added according to the different charging-current phases corresponding to the data in the region where the display data is located, such that the region to be adjusted may be dynamically determined to perform different current loading in different charging-current phases corresponding to one row of data. If the charging-current increase instruction is added in the charging-current rise phase, the corresponding pixel may quickly reach the target current, such that the pixel is charged fast. If the charging-current decrease instruction is added in the charging-current retention phase or the charging-current decrease phase, the power consumption may be reduced due to decrease of the current.

It should be noted that the above step 5011 may be performed for each row of data to be transmitted to the first driver chip. That is, the above steps B1 and/or B2 may be performed for each row of data of the first driver chip. Thus, the corresponding charging-current control instructions are added based on different phases of the charging current.

In the related art, the configuration instruction is located before and adjacent to the region where the display data of each row of data sent to the driver chip is located. Taking the aforementioned row of data to be sent to the first driver chip as an example, if the configuration instruction CTRL_L is added before the region where the display data of the row of data is located, after receiving the row of data, the first driver chip self-configures a drive parameter based on the configuration instruction CTRL_L first, and then drives the display panel based on the display data. Therefore, the configuration instruction CTRL_L is at least directed to all display data carried in one row of data. The configuration instruction CTRL_F is located after the end indicator K4 of the last row of data of each frame of data sent to the driver chip. Taking the row of data to be sent to the first driver chip as the last row of data as an example, if the configuration instruction CTRL_F is added after the end indicator K4 of the row of data, after receiving the row of data, the first driver chip self-configures a drive parameter based on the configuration instruction CTRL_F first, and then receives the next row of data to drive the display panel based on the display data of the next row of data. Therefore, the configuration instruction CTRL_L is at least directed to all display data of the next row of data. It thus may be known that the minimum granularity of parameter configuration in the related art is an entire length of the display data carried in one row of data.

In this embodiment, the controller adds the configuration instruction that matches the parameter adjustment condition before and adjacent to the region to be adjusted in the target region. In this way, after receiving the row of data, the first driver chip self-configures a drive parameter every time if a configuration instruction is detected, and then drives the display panel based on the data in the region to be adjusted. Therefore, the configuration instruction is at least directed to data in the region to be adjusted. The lengths of the regions to be adjusted may be the same or different. It thus may be known that the minimum granularity of parameter configuration in this embodiment is the length of the shortest region to be adjusted. Obviously, the region to be adjusted, as part of the region where display data is located, has the length smaller than the entire length of the display data carried in one row of data. Therefore, in this embodiment, the parameter configuration granularity of the process is finer, and a more subtle driving control process may be achieved.

In step 5012, at least one configuration instruction may be added to one row of data. If the configuration instruction to be added and the corresponding region to be adjusted are determined, for each region to be adjusted, the controller may add the configuration instruction to a position before and adjacent to the region to be adjusted in the target region.

Figure 11:
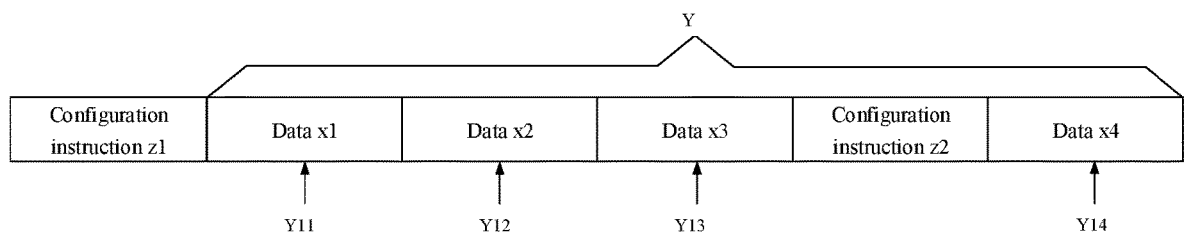
FIG. 11 is schematic diagram showing a position of an added configuration instruction based on the region where the display data is located as illustrated in FIG. 9.

As illustrated in FIG. 11, which a schematic diagram showing a position, to which a configuration instruction is added, of a region where the display data shown in FIG. 9 is located. It is assumed in FIG. 11 that a configuration instruction z1 is added to a position before and adjacent to a sub-region Y11 in the target region, and a configuration instruction z2 is added to a position before and adjacent to a sub-region Y14 in the target region. Thus, the configuration instruction z1 is an instruction at least for data x1 in the sub-region Y11. The configuration instruction z2 is an instruction at least for driving data x4 in the sub-region Y14.

In this embodiment, in the data transmitted to one segment of the first driver chip, a blank region is disposed between the display data of every two rows of data for separating the display data. The controller may divide the data of one segment into a plurality of rows of data according to a preset division rule and transmit the data to the first driver chip row by row. Based on different division rules, the segment where one row of data is located may be in different forms. After the division, the region where one row of data is located may include the region where the display data is located, and a blank region located before and/or after the region where the display data is located. For example, the region where one row of data is located includes a first blank region, the region where the data is displayed, and a second blank region, which are disposed sequentially. For another example, the region where one row of data is located includes the blank region and the region where the display data is located, which are sequentially disposed. For yet another example, the region where one row of data is located includes the region where the display data is located and the blank region, which are sequentially disposed.

Thus, as illustrated in FIG. 11, if the position before and adjacent to the sub-region Y11 in the target region is in the blank region, the configuration instruction z1 is added to the blank region; and if the position before and adjacent to the sub-region Y14 in the target region is in the region where the display data is located, the configuration instruction z2 is added to the region where the data is displayed.

Figure 12:
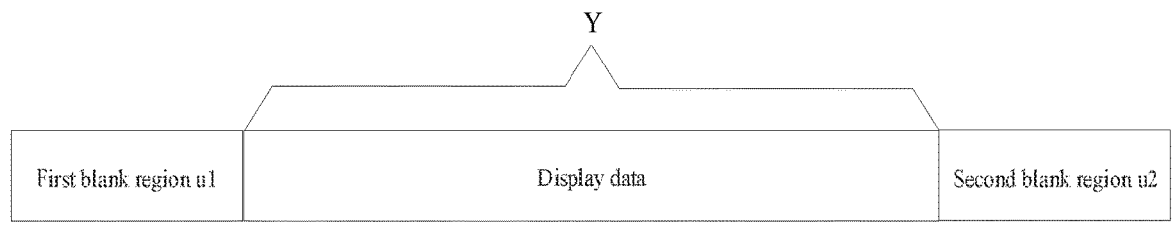
FIG. 12 is a schematic structural diagram of one row of data according to one exemplary embodiment.
Figure 13:
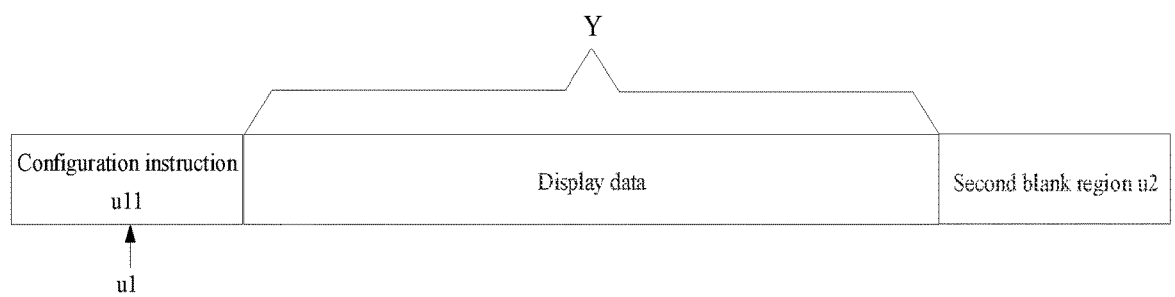
FIG. 13 is a schematic structural diagram of a target row of data after a configuration instruction is added to a first blank region.

As illustrated in FIG. 12, which is a schematic structural diagram of one row of data according to one exemplary embodiment, first data includes a first blank region u1, a region Y where display data is located, and a second blank region u2, which are sequentially disposed. The region Y where the display data is located may be partitioned or not. Assuming that a certain region to be adjusted is the sub-region Y11, then a configuration instruction u11 for the sub-region Y11 may be added to the first blank region u1. Referring to FIG. 13, a schematic structural diagram of a target row of data obtained by adding a configuration instruction u11 to the first blank region u1 is illustrated.

It is worth noting that if a configuration instruction needs to be added for start of the region where display data of the next row of data of the row of data in a first segment, a configuration instruction for at least part of display data in the next row of data may be added to the blank region if the end of the row of data includes a blank region. If the configuration instruction needs to be added for the row of data in the first segment, and the configuration instruction needs to be added before the data packet, a configuration instruction for the row of data may be added to the blank region at the end of the previous row of data of the row of data if the start position of the row of data does not include a blank region.

Figure 14:
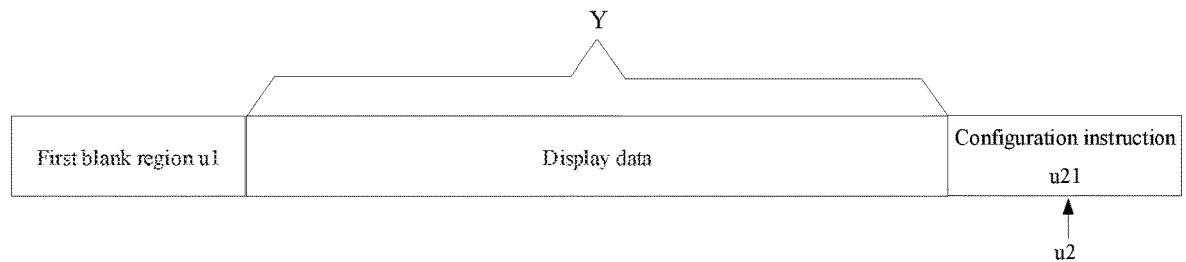
FIG. 14 is a schematic structural diagram of a target row of data after a configuration instruction is added to a second blank region.

Referring to FIG. 12, it is assumed that a configuration instruction needs to be added to the next row of data of the row of data shown in FIG. 12, a configuration instruction u21 for the next row of data may be added to the second blank region u2. Referring to FIG. 14, a schematic structural diagram of a target row of data after a configuration instruction u21 is added to the second blank region u2 is illustrated.

During implementation of this embodiment, the configuration instruction may be added to not only the region where display data is located but also the blank region.

Figure 15:
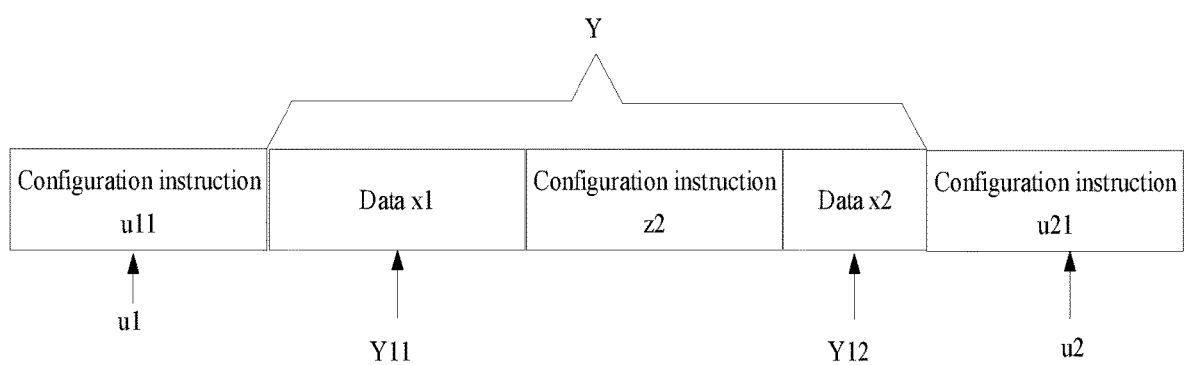
FIG. 15 is a schematic structural diagram of a target row of data according to one exemplary embodiment.

Referring to FIG. 15, a schematic structural diagram of a target row of data is illustrated. It is assumed that a configuration instruction u11 is added to a position before and adjacent to the sub-region Y11, namely, the first blank region u1; a configuration instruction z2 is added to a position before and adjacent to the sub-region Y12, namely, the region where display data is located; and a configuration instruction u21 is added to the second blank region u2. The configuration instruction z1 is an instruction for at least the data x1 in the sub-region Y11. The configuration instruction z2 is an instruction for at least the data in the sub-region Y12. The configuration instruction u21 is an instruction for at least part of the data in the next row of data of the target row of data.

It is worth noting that the blank region is usually intended to separate display data of two adjacent rows of data. Since the blank region may take a plurality of bytes, the configuration instruction added to the blank region may completely take bytes of the blank region. In an optional implementation, the configuration instruction usually takes part of the bytes of the blank region to effectively separate the display data.

This embodiment merely illustrates the position where the configuration instruction is added in the target region, and may not limit the position of the configuration instruction in the target region.

In step 503, the target row of data received by the first driver chip is row data obtained by the controller by adding at least one configuration instruction to a target region of one row of data. The target region includes at least one of a blank region and a region where display data is located. Target driving data is driving data required for the first driver chip to drive the display panel.

Referring to step 501, when the controller adds a configuration instruction, various implementations may be available for determining the region to be adjusted to add the configuration instruction. Correspondingly, various ways may also be available for the first driver chip to detect the configuration instruction to perform the configuration instruction in step 503 also in various way. This embodiment takes the following two implementations as examples for description.

In a first implementation, the region where display data is located includes a plurality of sub-regions. The process of self-configuring the drive parameter based on the configuration instruction of the target row of data in step 503 may include: for each sub-region, if the configuration instruction is added to the position before and adjacent to the sub-region in the target region, self-configuring a drive parameter based on the configuration instruction, and driving the display panel based on data in the sub-region.

The plurality of sub-regions may be obtained by the first driver chip according to a method appointed with the controller, and the lengths of the plurality of sub-regions may be equal or unequal. To simplify the division process, the lengths of the plurality of sub-regions are generally equal. The first driver chip may sequentially traverse the target row of data to determine a configuration instruction corresponding to each sub-region in the target region. If a configuration instruction is configured in a position before and adjacent to a certain sub-region in the target region, the drive parameter is self-configured based on the configuration instruction, and the display panel is driven based on the data in the sub-region.

This embodiment further illustrates the first implementable mode by taking the following exemplary implementations as examples for explanation.

In a first exemplary implementation, corresponding to step 501, if the display panel driven by the driver chip is a liquid crystal display panel, one frame of data includes a plurality of grayscale values. The parameter adjustment condition is an overdrive condition, and the configuration instruction is an overdrive configuration instruction. In this embodiment, the overdrive process requires the participation of the first driver chip. The present disclosure provides the following two overdrive modes for example.

In a first overdrive mode, if the configuration instruction is an overdrive configuration instruction, at least one parameter configuration operation of impedance adjustment and signal swing adjustment is performed. Exemplarily, if the overdrive configuration instruction is a positive overdrive configuration instruction, at least one parameter configuration operation of impedance reduction and signal swing increase is performed. If the overdrive configuration instruction is a negative overdrive configuration instruction, at least one parameter configuration operation of impedance increase and signal swing decrease is performed.

In a second overdrive mode, if the configuration instruction is an overdrive configuration instruction, the drive voltage is adjusted. Exemplarily, if the overdrive configuration instruction is a positive overdrive configuration instruction, the drive voltage is increased. If the overdrive configuration instruction is a negative overdrive configuration instruction, the drive voltage is decreased.

In a second exemplary implementation, the controller is connected to a plurality of driver chips by data lines. A switch is disposed between the data line connected to the first driver chip and the data line connected to the second driver chip. The second driver chip is one driver chip, adjacent to the first driver chip, of the plurality of driver chips. If the configuration instruction is a charge-sharing instruction, the switch is controlled to be turned on.

In a third exemplary implementation, the first driver chip is a source driver chip of the liquid crystal display panel. If the configuration instruction is a polarity inversion instruction, a direction of an electric field loaded into a liquid crystal layer is reversed.

For the principle of the first exemplary implementation of step 503, reference may be made to the principle of the first exemplary implementation of step 501, which is not described herein any further in this embodiment.

In a second implementation, corresponding to step 501, the process of self-configuring the drive parameter based on the configuration instruction of the target row of data includes:

step C1: increasing a drive current of the first driver chip if a charging-current increase instruction is detected in the target row of data; and/or step C2: decreasing a drive current of the first driver chip if a charging-current decrease instruction is detected in the target row of data.

For principles of steps C1 and C2, reference may be made to the principles of steps B1 and B2, which are not described herein any further in this embodiment.

It should be noted that the drive parameter refers to an adjustable relevant parameter used by the first driver chip to drive the display panel. For example, the drive parameter may include at least one parameter of a drive voltage, a charging current, an impedance, a signal swing, etc.

After the first driver chip self-configures the drive parameter based on one configuration instruction, its driving process for the display panel is performed under the configured drive parameter till a new drive parameter is configured again. In actual implementations, the drive parameter that adapts to part of one row of data may not adapt to the other part of data. Therefore, after receiving one configuration instruction, the first driver chip also needs to determine the data targeted by the configuration instruction. The data targeted by the configuration instruction refers to the display data on which the first driver chip is based to drive the display panel in a time period from the time when the drive parameter is adjusted based on the configuration instruction to the time when the drive parameter is restored to the initial drive parameter. The data targeted by the configuration instruction includes at least part of the data after the configuration instruction in the current target row of data. After the first driver chip finishes driving of the display panel based on the data targeted by the configuration instruction, it is necessary to restore the drive parameter configured based on the configuration instruction to the initial drive parameter. For step 503, the first driver chip may restore the drive parameter under the control of the driver. For example, the controller may add a relevant duration indicator to each configuration instruction to indicate a life cycle of the configuration instruction. The first driver chip performs timing after configuring the drive parameter based on the configuration instruction, and if it is determined that the life cycle is reached based on the duration indicator, the drive parameter configured based on the configuration instruction is restored to the initial drive parameter. Correspondingly, the data targeted by the configuration instruction is the data within this life cycle.

For another example, the controller may add a relevant data length indicator to each configuration instruction to indicate the length of data targeted by the configuration instruction. The first driver chip performs calculation after configuring the drive parameter based on the configuration instruction, and restores the drive parameter configured based on the configuration instruction to the initial drive parameter if the length of the data (namely, the acquired display data) based on which the display panel is driven reaches the length indicated by the data length indicator.

For yet another example, when it is necessary to restore the drive parameter to the initial drive parameter, the controller may add a configuration instruction, which instructs to restore the drive parameter to the initial drive parameter, to the target region of one current row of data to be sent to obtain a new target row of data. When acquiring the new target row of data, the first driver chip restores the drive parameter configured based on the corresponding configuration instruction to the initial drive parameter.

In this embodiment, the data targeted by the configuration instruction is adjustable in length and flexible in form, such that the flexibility in parameter configuration is improved. For example, the data targeted by the configuration instruction may be at least one piece of data in the target row of data, or may be the target row of data and at least one row of data after the target row of data. For example, 3840 rows of data is provided in total in the first segment, the target row of data is the second row of data in the first segment, and the data targeted by the configuration instruction may be part or all of the data in the second row of data, and may also be a part or all of one or a plurality of rows of data in the 2nd to 3840th rows.

It should be noted that in the first implementation of step 503, the first driver chip may automatically perform restoration to the initial drive parameter. Thus, for each sub-region, after each self-configuration of the drive parameter based on the configuration instruction and driving of the display panel based on the data in the sub-region, the drive parameter is restored to the initial drive parameter. In this way, if there is a configuration instruction in a position before and adjacent to a certain sub-region in the target region, after self-configuring the drive parameter based on the configuration instruction and driving the display panel based on the data in the sub-region, the first driver chip restores its own drive parameter to the initial drive parameter, such that the data targeted by the configuration instruction is the data in the certain sub-region.

Certainly, the first driver chip may also restore its own drive parameter based on an appointment with the controller. For example, every time during the display panel powers on, the first driver chip restores its own drive parameter to the initial drive parameter.

Continuously referring to step 501, the controller may add a configuration instruction in the form of a configuration set carrying an instruction identifier. Accordingly, after receiving the target row of data sent by the controller, the first driver chip may detect the instruction identifier. After detecting one instruction identifier each time, an instruction adjacent to and after or before the instruction identifier is determined as a configuration instruction. The instruction identifier is intended to indicate a position of the configuration instruction. Exemplarily, each instruction identifier is constituted by at least two different K-codes. For explanation of the instruction identifier, reference may be made to step 501, which is not described herein any further in this embodiment.

Figure 16:
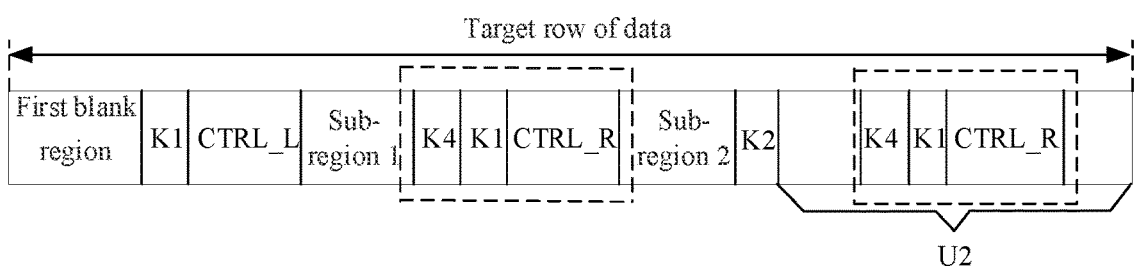
FIG. 16 is a schematic structural diagram of a target row of data in actual use according to one exemplary embodiment.

It should be noted that in an optional mode, other conventional configuration instructions may be added to the start and the end of the display data in the target row of data. For the ease of explanation, the conventional configuration instructions are not drawn in the drawings corresponding to the above embodiments. Referring to FIG. 16, a schematic structural diagram of a target row of data in actual use according to one exemplary embodiment is illustrated. The target row of data includes a first blank region, a start indicator K1, a configuration instruction CTRL_L, a sub-region 1 carrying data, an instruction identifier constituted by K4 and K1, a configuration instruction CTRL_R, a sub-region 2 carrying data, an end indicator K2 and a second blank region u2 which are sequentially arranged. The second blank region u2 includes an instruction identifier constituted by K4 and K1, and a configuration instruction CTRL_R which are sequentially arranged. Wherein the start indicator K1 indicates the start of the display data of the target row of data, the end indicator K2 indicates the end of the display data of the target row of data, the configuration instruction CTRL_L is a conventional configuration instruction, located between the start indicator K1 and the region where the display data is located, and intended to indicate the start of each frame of data, a polarity inversion control instruction, a low-power-consumption mode, or a timing sequence of a source driver chip loading instruction. According to this embodiment, the configuration instruction CTRL_R is an instruction configured in the target region, and it may be a charging-current control instruction, an overdrive configuration instruction, a charge-sharing instruction, or a polarity inversion control instruction. The region in the dashed box of FIG. 16 is the region where the configuration set is located. FIG. 16 only takes the case where the region where the display data is located includes two sub-regions, and configuration set is added before the sub-region 2 of the target row of data and the second blank region u2 as an example for description, and may not limit the number or positions of data bits added to the target row of data. It should be noted that if the target row of data is the last row of data of one frame of data, and a configuration instruction CTRL_F is added to the target row of data, the configuration instruction CTRL_F is configured after and adjacent to the end indicator K4.

It should be noted that the sequence of the steps of the drive control method according to this embodiment may be appropriately adjusted, and the steps may be increased or decreased accordingly. Within the technical scope disclosed by the present disclosure, any variations of the method easily derived by a person of ordinary skill in the art shall fall within the scope of protection the present disclosure, and thus, will not be repeated herein.

In summary, in the drive control method according to this embodiment, since at least one configuration instruction may be added, according to actual situations, to at least one of the blank region of one row of data and the region where the display data is located in one row of data to obtain the target row of data, and the obtained target row of data is sent to the first driver chip, compared with a method of adding a configuration instruction to a fixed position of each row of data, the method of adding the configuration instruction in this embodiment is more flexible. Thus, the flexibility in adding the configuration instruction is improved, and the parameter configuration granularity in the driving control process is more subtle. Optionally, if the configuration instruction is an overdrive configuration instruction, executing the overdrive configuration instruction may make the target drive data quickly reach a required value. Optionally, if the configuration instruction is added based on the different charging-current phases corresponding to the drive data, different current is loaded in the different charging-current phases corresponding to one row of data. If the charging-current increase instruction is added in the charging-current rise phase, the corresponding pixel may quickly reach a target current, such that the pixel is charged fast. If a charging-current decrease instruction is added in the charging-current retention phase or charging-current decrease phase, the power consumption may be reduced due to decrease of current.

Figure 17:
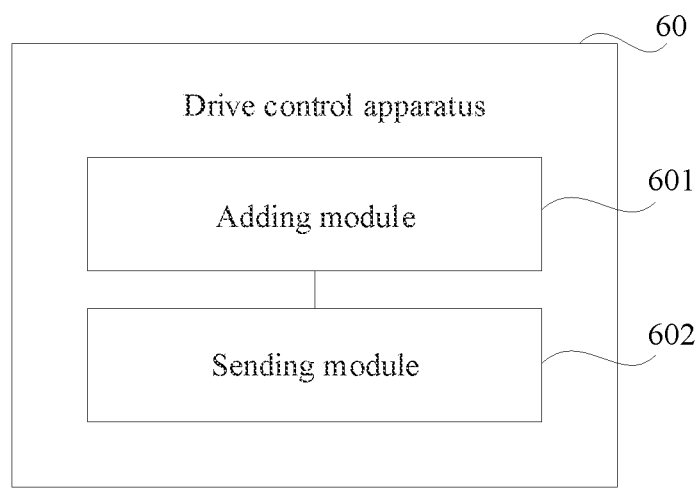
FIG. 17 is a schematic structural diagram of a drive control apparatus according to one exemplary embodiment.

FIG. 17 is a schematic structural diagram of a drive control apparatus 60 according to an embodiment of the present disclosure. As illustrated in FIG. 17, the drive control apparatus 60 is applied to a controller connected to a first driver chip, and includes:

an adding module 601, operable to add at least one configuration instruction into a target region of one row of data to obtain a target row of data, wherein the target region includes at least one of a blank region and a region where display data is located; and a sending module 602, operable to send the target row of data to a first driver chip, wherein the configuration instruction is configured for self-configuration of a drive parameter by the first driver chip.

In the drive control apparatus according to this embodiment, since the adding module may add, based on actual situations, at least one configuration instruction to at least one of the blank region of one row of data and the region where the display data is located in one row of data to obtain the target row of data, and the sending module sends the target row of data to the first driver chip, compared with a method of adding a configuration instruction to a fixed position of each row of data, the method in adding the configuration instruction in this embodiment is more flexible. Thus, the flexibility in adding the configuration instruction is improved.

Figure 18:
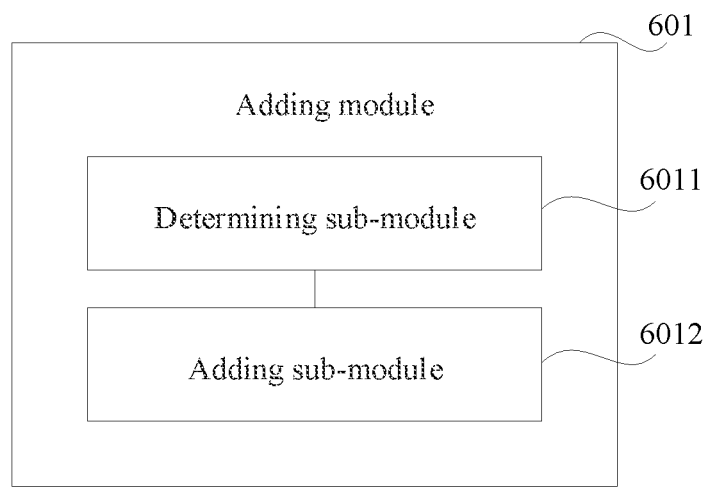
FIG. 18 is a schematic structural diagram of an adding module according to one exemplary embodiment.

Optionally, as illustrated in FIG. 18, the adding module 601 includes:

a determining sub-module 6011, operable to determine at least one region to be adjusted in the region where the display data is located; and an adding sub-module 6012, operable to, with respect to each of the regions to be adjusted, add a configuration instruction that matches the region to be adjusted to a position before and adjacent to the region to be adjusted in the target region.

Optionally, the region where the display data is located includes a plurality of sub-regions.

The determining sub-module 6011 is operable to:

sequentially detect whether data in each of the sub-regions meets a parameter adjustment condition; and determine a region whose data meets the parameter adjustment condition as the region to be adjusted.

Figure 19:
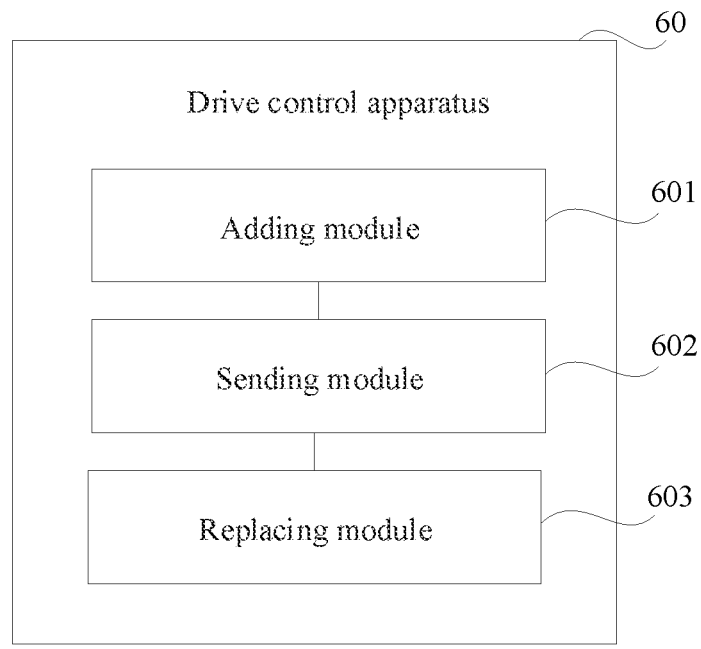
FIG. 19 is a schematic structural diagram of a drive control apparatus according to another exemplary embodiment.

Optionally, the parameter adjustment condition is an overdrive condition; and the configuration instruction is an overdrive configuration instruction, wherein the overdrive configuration instruction is intended to instruct the first driver chip to perform at least one parameter configuration operation of impedance adjustment and signal swing adjustment; and as illustrated in FIG. 19, the drive control apparatus 60 further includes:

a replacing module 603, operable to replace data in the region to be adjusted with overdrive data before the target row of data is sent to the first driver chip.

Optionally, the parameter adjustment condition is an overdrive condition, the configuration instruction is an overdrive configuration instruction, and the overdrive configuration instruction is intended to instruct the first driver chip to adjust a drive current.

Optionally, the controller is connected to a plurality of driver chips by data lines, a switch being disposed between a data line connected to the first driver chip and a data line connected to a second driver chip, wherein the second driver chip is one driver chip, adjacent to the first driver chip, in the plurality of driver chips, the parameter adjustment condition is a charge-sharing condition, and the configuration instruction is a charge-sharing instruction; or the first driver chip is a source driver chip of a liquid crystal display screen, the parameter adjustment condition is a polarity inversion condition, and the configuration instruction is a polarity inversion instruction.

Optionally, the determining sub-module 6011 is operable to:

if one piece of data in the region where the display data is located corresponds to a charging-current rise phase, determine the region where the piece of data is located as a region to be adjusted, wherein the configuration instruction is a charging-current increase instruction; and/or if another piece of data in the region where the display data is located corresponds to a charging-current retention phase or a charging-current drop phase, determine the region where another piece of data is located as a region to be adjusted, wherein the configuration instruction is a charging-current decrease instruction.

Optionally, the adding module 601 is operable to:

add at least one configuration set into the target region of the row of data to obtain the target row of data;

wherein each of the at least one configuration set includes the configuration instruction and an instruction identifier adjacent to and before or after the configuration instruction, wherein the instruction identifier is intended to indicate a position of the configuration instruction.

Optionally, each of the instruction identifiers is constituted by at least two different K-codes.

In the drive control apparatus according to this embodiment, since the adding module may add, based on actual situations, at least one configuration instruction to at least one of the blank region of one row of data and the region where the display data is located in one row of data, and the sending module sends the target row of data to the first driver chip, compared with a method of adding a configuration instruction to a fixed position of each row of data, the method of adding the configuration instruction in this embodiment is more flexible. Thus, the flexibility in adding the configuration instruction is improved.

Figure 20:
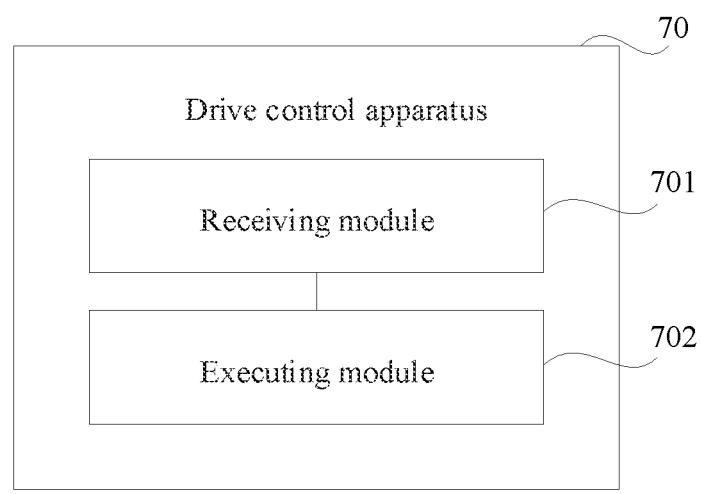
FIG. 20 is a schematic structural diagram of another drive control apparatus according to another exemplary embodiment.

FIG. 20 is a schematic structural diagram of a drive control apparatus 70 according to an embodiment of the present disclosure. As illustrated in FIG. 20, the drive control apparatus 70 is applied to a first driver chip, and includes:

a receiving module 701, operable to receive a target row of data sent by a controller, wherein the target row of data is row data obtained by adding, by the controller, at least one configuration instruction into a target region of one row of data, and the target region includes at least one of a blank region and a region where display data is located; and an executing module 702, operable to self-configure a drive parameter based on the configuration instruction of the target row of data, and drive a display panel based on display data of the target row of data.

In the drive control apparatus according to this embodiment, since the target row of data sent by the controller and received by the receiving module is the row data obtained by adding at least one configuration instruction into the target region of one row of data, and the executing module may self-configure the drive parameter based on the configuration instruction of the target row of data and drive the display panel based on the display data of the target row of data, compared with a method of performing driving control based on the configuration instruction added to a fixed position of each row of data, the method of performing driving control based on the configuration instruction added to the target region in this embodiment is higher in flexibility. Thus, the flexibility in adding the configuration instruction is improved.

Optionally, the region where the display data is located includes a plurality of sub-regions; and the executing module 702 is operable to:

with respect to each of the sub-regions, if a configuration instruction is configured in a position before and adjacent to the sub-region in the target region, self-configure a drive parameter based on the configuration instruction.

Figure 21:
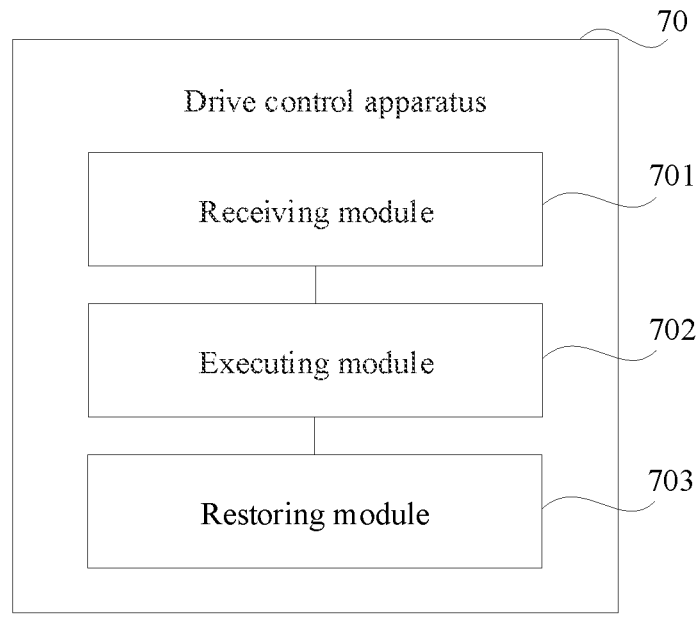
FIG. 21 is a schematic structural diagram of yet another drive control apparatus according to yet another exemplary embodiment.

Optionally, as illustrated in FIG. 21, the drive control apparatus 70 further includes:

a restoring module 703, operable to, after self-configuring the drive parameter based on the configuration instruction and driving the display panel based on the data in the sub-region each time, restore its own drive parameter to an initial drive parameter.

Optionally, the executing module 702 is operable to:

perform at least one parameter configuration operation of impedance adjustment and signal swing adjustment if the configuration instruction is an overdrive configuration instruction; or adjust a drive voltage if the configuration instruction is an overdrive configuration instruction; or control a switch to be turned on if the configuration instruction is a charge-sharing instruction, wherein the controller is connected to a plurality of driver chips by data lines, the switch is disposed between a data line connected to the first driver chip and a data line connected to a second driver chip, and the second driver chip is one driver chip, adjacent to the first driver chip, in the plurality of driver chips; or reverse a direction of an electric field loaded into a liquid crystal layer if the configuration instruction is a polarity inversion instruction, wherein the first driver chip is a source driver chip of a liquid crystal display screen.

Optionally, the executing module 702 is operable to:

increase a drive current of the first driver chip if a charging-current increase instruction is detected in the target row of data; and decrease the drive current of the first driver chip if a charging-current decrease instruction is detected in the target row of data.

Figure 22:
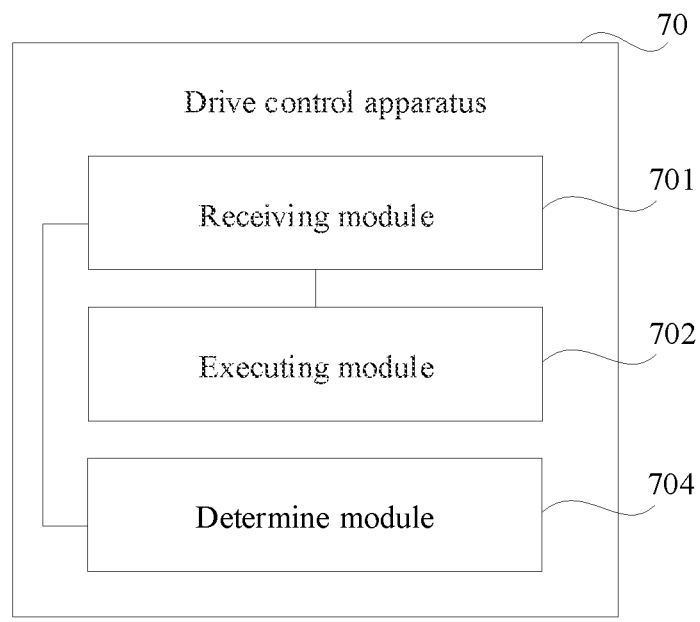
FIG. 22 is a schematic structural diagram of yet another drive control apparatus according to yet another exemplary embodiment.

Optionally, as illustrated in FIG. 22, the drive control apparatus 70 further includes:

a determine module 704, operable to, after receiving of the target row of data sent by the controller and each detection of one instruction identifier, determine an instruction adjacent to and after or before the instruction identifier as a configuration instruction, wherein the instruction identifier is intended to indicate a position of the configuration instruction.

Optionally, each of the instruction identifiers is constituted by at least two different K-codes.

In the drive control apparatus according to this embodiment, since the target row of data sent by the controller and received by the receiving module is the row data obtained by adding at least one configuration instruction into the target region of one row of data, and the executing module may self-configure the drive parameter based on the configuration instruction of the target row of data and drive the display panel based on the display data of the target row of data, compared with a method of performing driving control based on the configuration instruction added to a fixed position of each row of data, the method of performing driving control based on the configuration instruction added to the target region in this embodiment is higher in flexibility. Thus, the flexibility in adding the configuration instruction is improved.

Figure 23:
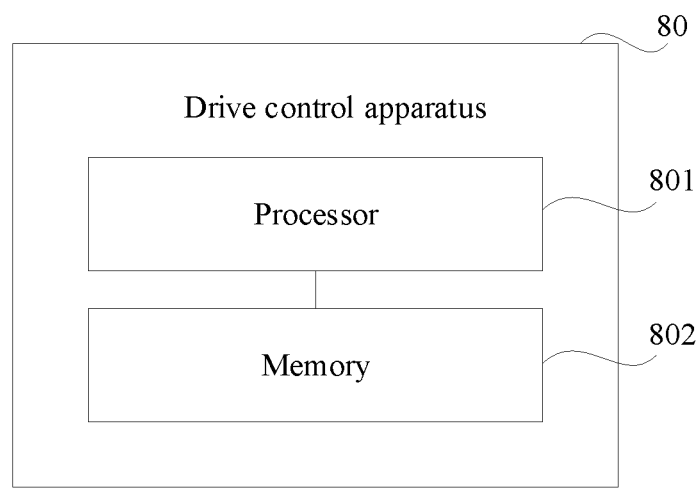
FIG. 23 is a schematic structural diagram of yet another drive control apparatus according to yet another exemplary embodiment.

An embodiment of the present disclosure provides a drive control apparatus 80 applied to a controller. The controller is connected to a plurality of driver chips. As illustrated in FIG. 23, the device 80 includes:

a processor 801; and a memory 802 storing instructions executable by the processor;

wherein the processor is operable to perform the drive control method performed by the controller according to the above embodiments.

Figure 24:
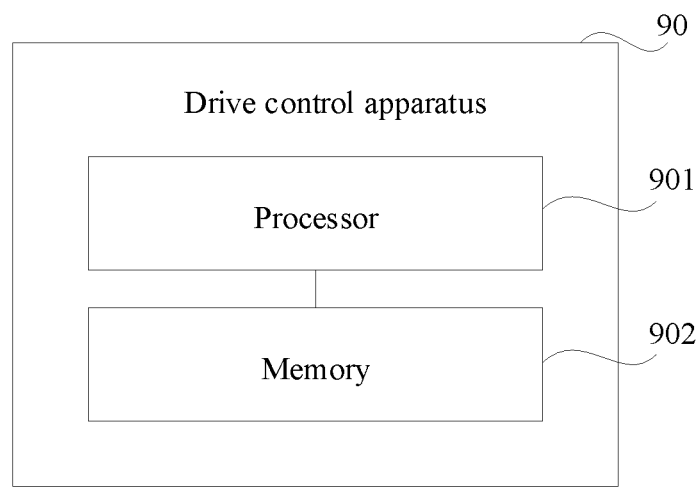
FIG. 24 is a schematic structural diagram of yet another drive control apparatus according to yet another exemplary embodiment.

An embodiment of the present disclosure provides a drive control apparatus 90 applied to a first driver chip. The first driver chip is one of the plurality of driver chips which is connected to the controller. As illustrated in FIG. 24, the device 90 includes:

a processor 901; and a memory 902 storing instructions executable by the processor;

wherein the processor is operable to perform the drive control method performed by the first driver chip according to the above embodiments.

An embodiment of the present disclosure provides a display device. The display device includes a controller and a plurality of driver chips. The controller includes the drive control apparatus 60 as illustrated in FIG. 17 or FIG. 19. The plurality of driver chips includes the drive control apparatus 70 shown in any of FIGS. 20-22.

Alternatively, the controller includes the drive control apparatus 80 shown in FIG. 23, and the plurality of driver chips includes the drive control apparatus 90 shown in FIG. 24.

The display device may be any product or component having a display function, such as a liquid crystal panel, electronic paper, an OLED panel, a mobile phone, a tablet computer, a television, a monitor, a notebook computer, a digital photo frame and a navigator, etc.

Figure 25:
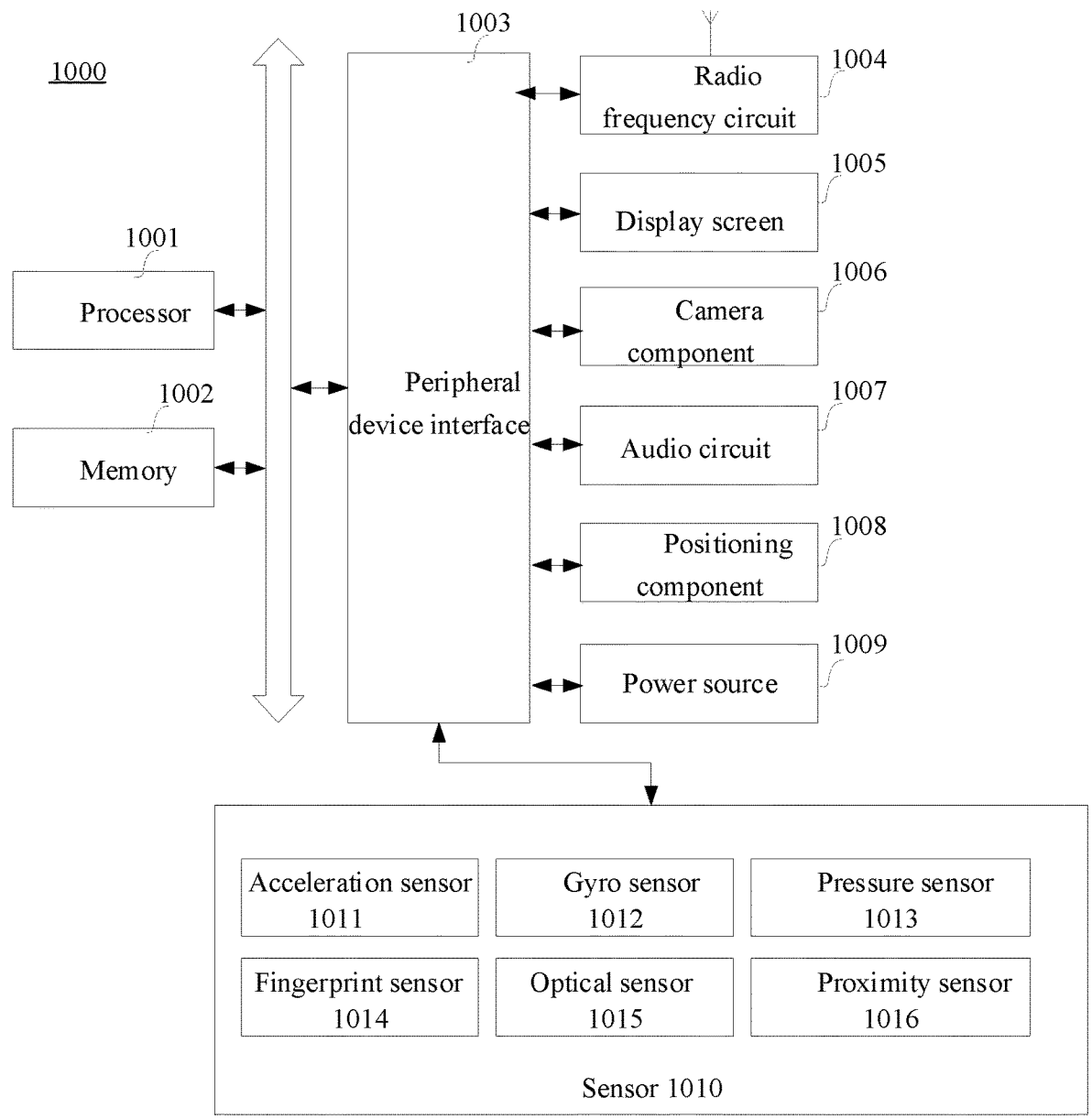
FIG. 25 is a schematic structural diagram of a display device according to one exemplary embodiment.

FIG. 25 is a structural block diagram of a display device 1000 according to an exemplary embodiment of the present disclosure. The device 1000 may be any product or component having a display function, such as a liquid crystal panel, electronic paper, an OLED panel, a mobile phone, a tablet computer, a television, a monitor, a notebook computer, a digital photo frame and a navigator, etc. Generally, the device 1000 includes a processor 1001 and a memory 1002.

The processor 1001 may include one or more processing cores, such as a 4-core processor and an 8-core processor. The processor 1001 may be implemented by at least one of hardware forms of a digital signal processing (DSP), a field-programmable gate array (FPGA), and a programmable logic array (PLA). The processor 1001 may also include a main processor and a coprocessor. The main processor is a processor for processing data in an awaken state, and is also called as central processing unit (CPU). The coprocessor is a low-power consumption processor for processing data in a standby state. In some embodiments, the processor 1001 may be integrated with a graphics processing unit (GPU), which is responsible for rendering and drawing of content that needs to be displayed on a display screen. In some embodiments, the processor 1001 may further include an Artificial Intelligence (AI) processor, operable to process computational operations related to machine learning.

The memory 1002 may include one or more computer readable storage mediums, which may be non-transitory. The memory 1002 may also include a high-speed random-access memory, and a non-volatile memory such as one or more magnetic disk storage devices and flash memory storage devices. In some embodiments, the non-transitory computer readable storage medium in the memory 1002 is operable to store at least one instruction. The at least one instruction is intended to be executed by the processor 1001 to implement the drive control method according to the method embodiments of the present disclosure.

In some embodiments, the device 1000 optionally further includes a peripheral device interface 1003 and at least one peripheral device. The processor 1001, the memory 1002, and the peripheral device interface 1003 may be connected by a bus or a signal line. Each peripheral device may be connected to the peripheral device interface 1003 by a bus, a signal line, or a circuit board. Specifically, the peripheral device includes at least one of a radio frequency circuit 1004, a display screen 1005, a camera component 1006, an audio circuit 1007, a positioning component 1008, and a power source 1009.

The peripheral device interface 1003 may be operable to connect at least one input/output (I/O)-associated peripheral device to the processor 1001 and the memory 1002. In some embodiments, the processor 1001, the memory 1002, and the peripheral interface 1003 are integrated on the same chip or circuit board. In some other embodiments, any one or two of the processor 1001, the memory 1002, and the peripheral interface 1003 may be implemented on a separate chip or circuit board, which is not limited in this embodiment.

The radio frequency circuit 1004 is operable to receive and transmit an radio frequency (RF) signal, which is also referred to as an electromagnetic signal. The radio frequency circuit 1004 communicates with the communication network and other communication devices via the electromagnetic signal. The radio frequency circuit 1004 converts the electrical signal into the electromagnetic signal for transmission, or converts the received electromagnetic signal into the electrical signal. Optionally, the radio frequency circuit 1004 includes an antenna system, an RF transceiver, one or more amplifiers, a tuner, an oscillator, a digital signal processor, a coding and decoding chipset, a subscriber identity module card, and the like. The radio frequency circuit 1004 may communicate with other devices via at least one wireless communication protocol. The wireless communication protocol includes, but not limited to, a World Wide Web, a metropolitan area network, an intranet, various generations of mobile communication networks (2G, 3G, 4G, and 5G), a wireless local area network, and/or a wireless fidelity (WiFi) network. In some embodiments, the radio frequency circuit 1004 may also include a near field communication (NFC)-related circuit, which is not limited in the present disclosure.

The display screen 1005 is operable to display a user interface (UI). The UI may include graphics, texts, icons, videos, and any combination thereof. When the display screen 1005 is a touch display screen, the display screen 1005 also has the capability of capturing a touch signal on the surface or over the surface of the display screen 1005. The touch signal may be input to the processor 1001 as a control signal for processing. At this point, the display screen 1005 may also be operable to provide virtual buttons and/or a virtual keyboard, which are also referred to as soft buttons and/or soft keyboard. In some embodiments, one display screen 1005 may be disposed, and disposed at the front panel of the device 1000. In other embodiments, at least two display screens 1005 are disposed, and are respectively disposed on different surfaces of the device 1000 or in a folded design. In still other embodiments, the display screen 1005 may be a flexible display screen disposed on a curved surface or folded surface of the device 1000. The display screen 1005 may even be set to a non-rectangular irregular pattern, that is, irregular screen. The display screen 1005 may be an LCD display panel or an OLED display panel, etc.

The camera component 1006 is operable to capture images or videos. Optionally, the camera component 1006 includes a front camera and a rear camera. Typically, the front camera is placed on the front panel of the device and the rear camera is placed on the back surface of the device. In some embodiments, at least two rear cameras are disposed and are respectively any one type of a main camera, a depth camera, a wide-angle camera, and a telephoto camera, to realize the background blur function realized by fusion of the main camera and the depth camera, the panoramic shooting and virtual reality (VR) shooting realized by fusion of the main camera and the wide-angle camera, or other fused shooting functions. In some embodiments, the camera component 1006 may also include a flash. The flash may be a monochrome temperature flash or a two-color temperature flash. The two-color temperature flash is a combination of a warm flash and a cool flash and may be used for light compensation at different color temperatures.

The audio circuit 1007 may include a microphone and a speaker. The microphone is operable to capture sound waves of the user and the environment, and convert the sound waves into electrical signals for being input to the processor 1001 for processing, or being input to the radio frequency circuit 1004 for voice communication. For the purpose of stereo acquisition or noise reduction, a plurality of microphones may be disposed, and are respectively disposed at different portions of the device 1000. The microphone may also be an array microphone or an omnidirectional acquisition microphone. The speaker is then operable to convert the electrical signals from the processor 1001 or the radio frequency circuit 1004 into the sound waves. The speaker may be a conventional film speaker or a piezoelectric ceramic speaker. When the speaker is the piezoelectric ceramic speaker, the electrical signals may be converted into the sound waves audible to humans, and the electrical signals may also be converted into the sound waves inaudible to humans for the purpose such as ranging. In some embodiments, the audio circuit 1007 may also include a headphone jack.

The positioning component 1008 is operable to position the current geographic location of the device 1000 to implement navigation or location-based services (LBS). The positioning component 1008 may be a positioning component based on the global positioning system (GPS) of the United States, the Beidou positioning system from China, the Grenas satellite positioning system from Russia or the Galileo satellite navigation system from the European Union.

The power source 1009 is operable to supply power for various components in the device 1000. The power source 1009 may be alternating current, direct current, a disposable battery, or a rechargeable battery. When the power source 1009 includes the rechargeable battery, the rechargeable battery may be a wired rechargeable battery or a wireless rechargeable battery. The wired rechargeable battery is charged by wired charging circuit, and the wireless rechargeable battery is charged by wireless charging coils. The rechargeable battery may also be operable to support the fast charging technology.

In some embodiments, the device 1000 also includes one or more sensors 1010. The one or more sensors 1010 include, but not limited to, an acceleration sensor 1011, a gyro sensor 1012, a pressure sensor 1013, a fingerprint sensor 1014, an optical sensor 1015, and a proximity sensor 1016.

The acceleration sensor 1011 may detect the magnitude of the acceleration on the three coordinate axes of a coordinate system established by the device 1000. For example, the acceleration sensor 1011 may be operable to detect the components of gravity acceleration on the three coordinate axes. The processor 1001 may control the touch display screen 1005 to display a user interface in a landscape view or a portrait view according to the gravity acceleration signal captured by the acceleration sensor 1011. The acceleration sensor 1011 may also be used for capturing game or user motion data.

The gyro sensor 1012 may detect the body direction and the rotation angle of the device 1000, and the gyro sensor 1012 may cooperate with the acceleration sensor 1011 to capture the 3D motion of the user on the device 1000 synergistically. According to the data captured by the gyro sensor 1012, the processor 1001 may implement the following functions of motion sensing (for example, changing the UI according to the tilting operation of the user), image stabilization at the time of shooting, game control, and inertial navigation.

The pressure sensor 1013 may be disposed on a side frame of the device 1000 and/or a lower layer of the touch display screen 1005. If the pressure sensor 1013 is disposed on the side frame of the device 1000, the holding signal of the user for the device 1000 may be detected, and the processor 1001 performs left and right-hand recognition or shortcut operation according to the holding signal captured by the pressure sensor 1013. If the pressure sensor 1013 is disposed on the lower layer of the touch display screen 1005, the processor 1001 controls an operability control on the UI interface according to the pressure operation of the user on the touch display screen 1005. The operability control includes at least one of a button control, a scroll bar control, an icon control, and a menu control.

The fingerprint sensor 1014 is operable to capture the fingerprint of the user, and the processor 1001 identifies the identity of the user according to the fingerprint captured by the fingerprint sensor 1014, or the fingerprint sensor 1014 identifies the identity of the user according to the captured fingerprint. When identifying that the identity of the user is a trusted identity, the processor 1001 authorizes the user to perform related sensitive operations, including unlocking the screen, viewing encrypted information, downloading software, paying and changing settings, and the like. The fingerprint sensor 1014 may be placed on the front, back or side surface of the device 1000. If the device 1000 is provided with a physical button or manufacturer logo, the fingerprint sensor 1014 may be integrated with a physical button or vendor logo.

The optical sensor 1015 is operable to capture ambient light intensity. In one embodiment, the processor 1001 may control the display brightness of the touch display screen 1005 based on the ambient light intensity captured by the optical sensor 1015. Specifically, if the ambient light intensity is relatively high, the display brightness of the touch display screen 1005 is raised. If the ambient light intensity is relatively low, the display brightness of the touch display screen 1005 is lowered. In another embodiment, the processor 1001 may also dynamically adjust the shooting parameters of the camera component 1006 based on the ambient light intensity captured by the optical sensor 1015.

The proximity sensor 1016, also referred to as a distance sensor, is typically disposed on the front panel of the device 1000. The proximity sensor 1016 is operable to capture a distance between the user and the front surface of the device 1000. In one embodiment, if the proximity sensor 1016 detects that the distance between the user and the front surface of the device 1000 gradually decreases, the touch screen 1005 is controlled by the processor 1001 to switch from a screen on state to a screen-off state; and if the proximity sensor 1016 detects that the distance between the user and the front surface of the device 1000 gradually increases, the processor 1001 controls the touch display screen 1005 to switch from the screen off state to the screen on state.

It will be understood by those skilled in the art that the structure shown in FIG. 25 does not constitute a limitation on the device 1000, and may include more or fewer components than those illustrated, or combine some components or adopt different component arrangements.

An embodiment of the present disclosure provides a computer readable storage medium, which stores instructions. The computer readable storage medium, when running in processing component, may cause the processing component to perform the drive control method according to the embodiments of the present disclosure.

An embodiment of the present disclosure provides a chip. The chip includes a programmable logic circuit and/or program instruction. The chip is operable to perform the drive control method according to the embodiments of the present disclosure when the chip operates.

An embodiment of the present disclosure also provides a computer program product, the computer program product stores instructions. When the computer program product operates on a computer, the computer is caused to perform the drive control method according to the embodiments of the present disclosure.

With respect to the device in the aforesaid embodiments, the specific implementation in which the respective modules perform the operations has been described in detail in embodiments of the method, and will not be explained in detail herein.

Other embodiments of the present disclosure are apparent to those skilled in the art based on consideration of the specification and practice of the present disclosure. The present disclosure is intended to cover any variations, uses, or adaptations of the present disclosure following the general principles thereof and including common knowledge or commonly used technical measures which are not disclosed herein. The specification and embodiments are to be considered as exemplary only, and the scope and spirit of the present disclosure are defined by the appended claims.

It is to be understood that the present disclosure is not limited to the precise constructions described above and shown in the enclosed drawings, and various modifications and changes may be made without departing from the scope thereof. The scope of the present disclosure is subject to only the appended claims.

What is claimed is:

1. A drive control method, being applied to a controller, the method comprising:
adding at least one configuration instruction into a target region of one row of data to obtain a target row of data, wherein the target region comprises at least one of a blank region and a region where display data is located; and
sending the target row of data to a first driver chip, wherein the configuration instruction is intended for self-configuration of a drive parameter by the first driver chip,
wherein adding the at least one configuration instruction into the target region of the row of data to obtain the target row of data comprises:
determining at least one region to be adjusted in the region where the display data is located; and
with respect to each of the at least one region to be adjusted, adding a configuration instruction that matches the region to be adjusted to a position before and adjacent to the region to be adjusted in the target region,
wherein determining the at least one region to be adjusted in the region where the display data is located comprises at least one of:
in response to one piece of data in the region where the display data is located corresponds to a charging-current rise phase, determining the region where the piece of data is located as a region to be adjusted, wherein the configuration instruction is a charging-current increase instruction; and
in response to another piece of data in the region where the display data is located corresponds to a charging-current retention phase or a charging-current drop phase, determining the region where another piece of data is located as a region to be adjusted, wherein the configuration instruction is a charging-current decrease instruction,
wherein adding the at least one configuration instruction into the target region of the row of data to obtain the target row of data comprises:
adding at least one configuration set into the target region of the row of data to obtain the target row of data;
wherein each of the at least one configuration set comprises the configuration instruction and an instruction identifier adjacent to and before or after the configuration instruction, the instruction identifier being intended to indicate a position of the configuration instruction,
wherein each of the at least one instruction identifier is constituted by at least two different K-codes.

2. The method according to claim 1, wherein the region where the display data is located comprises a plurality of sub-regions; and determining the at least one region to be adjusted in the region where the display data is located comprises:
sequentially detecting whether data in each of the sub-regions meets a parameter adjustment condition; and
determining a region where data meets the parameter adjustment condition as the region to be adjusted.

3. The method according to claim 2, wherein the parameter adjustment condition is an overdrive condition; and the configuration instruction is an overdrive configuration instruction, the overdrive configuration instruction being intended to instruct the first driver chip to perform at least one parameter configuration operation of impedance adjustment and signal swing adjustment; and
before sending the target row of data to the first driver chip, the method further comprises: replacing data in the region to be adjusted with overdrive data.

4. The method according to claim 2, wherein the parameter adjustment condition is an overdrive condition; and the configuration instruction is an overdrive configuration instruction, the overdrive configuration instruction being intended to instruct the first driver chip to adjust a drive current.

5. The method according to claim 2, wherein the parameter adjustment condition, the configuration instruction and the first driver chip fall within one of the following relationships:
the controller is connected to a plurality of driver chips by data lines, a switch being disposed between a data line connected to the first driver chip and a data line connected to a second driver chip, the second driver chip being one driver chip, adjacent to the first driver chip, in the plurality of driver chips, the parameter adjustment condition is a charge-sharing condition, and the configuration instruction is a charge-sharing instruction; and
the first driver chip is a source driver chip of a liquid crystal display screen, the parameter adjustment condition is a polarity inversion condition, and the configuration instruction is a polarity inversion instruction.

6. A drive control apparatus, being applied to a controller, the apparatus comprising:
a processor; and
a memory operable to store an instruction executable by the processor;
wherein the processor is operable to perform the drive control method as defined in claim 1.

7. A computer-readable storage medium, wherein at least one instruction is stored in the computer-readable storage medium, and the computer-readable storage medium, when running on a processing component, causes the processing component to perform one of the drive control method as defined in claim 1.

8. A drive control method, being applied to a first driver chip, the method comprising:
receiving a target row of data sent by a controller, wherein the target row of data is row data obtained by adding, by the controller, at least one configuration instruction into a target region of one row of data, the target region comprising at least one of a blank region and a region where display data is located; and
self-configuring a drive parameter based on the configuration instruction of the target row of data, and driving a display panel based on display data of the target row of data,
wherein self-configuring the drive parameter based on the configuration instruction of the target row of data comprises at least one of:
increasing a drive current of the first driver chip in a case that a charging-current increase instruction is detected in the target row of data; and
decreasing the drive current of the first driver chip in a case that a charging-current decrease instruction is detected in the target row of data,
wherein after receiving the target row of data sent by the controller, the method further comprises:
each time one instruction identifier is detected, determining an instruction adjacent to and after or before the instruction identifier as a configuration instruction, wherein the instruction identifier is intended to indicate a position of the configuration instruction,
wherein each of the at least one instruction identifier is constituted by at least two different K-codes.

9. The method according to claim 8, wherein the region where the display data is located comprises a plurality of sub-regions; and self-configuring the drive parameter based on the configuration instruction of the target row of data comprises:
with respect to each of the sub-regions, in a case that a configuration instruction is located before and adjacent to the sub-region in the target region, self-configuring a drive parameter based on the configuration instruction.

10. The method according to claim 9, further comprising:
restoring the drive parameter thereof to an initial drive parameter after self-configuring the drive parameter based on the configuration instruction and driving the display panel based on the data in the sub-region each time.

11. The method according to claim 8, wherein self-configuring the drive parameter based on the configuration instruction comprises at least one of:
performing at least one parameter configuration operation of impedance adjustment and signal swing adjustment in a case that the configuration instruction is an overdrive configuration instruction;
adjusting a drive voltage in a case that the configuration instruction is an overdrive configuration instruction;
controlling a switch to be turned on in a case that the configuration instruction is a charge-sharing instruction, wherein the controller is connected to a plurality of driver chips by data lines, and the switch is disposed between a data line connected to the first driver chip and a data line connected to a second driver chip, the second driver chip being one driver chip, adjacent to the first driver chip, in the plurality of driver chips; and
reversing a direction of an electric field loaded into a liquid crystal layer in a case that the configuration instruction is a polarity inversion instruction, wherein the first driver chip is a source driver chip of a liquid crystal display screen.

12. A drive control apparatus, being applied to a controller, the apparatus comprising:
a processor; and
a memory operable to store at least one instruction executable by the processor;
wherein the processor is operable to perform the drive control method as defined in claim 10.

13. A display device, comprising a controller and a plurality of driver chips; wherein
the controller comprises a first processor and a first memory operable to store at least one instruction executable by the first processor; wherein the first processor is operable to:
add at least one configuration instruction in a target region of one row of data to obtain a target row of data, wherein the target region comprises at least one of a blank region and a region where display data is located; and
send the target row of data to a first driver chip, wherein the configuration instruction is intended to for self-configuration of a drive parameter by the first driver chip,
wherein adding the at least one configuration instruction into the target region of the row of data to obtain the target row of data comprises:
determining at least one region to be adjusted in the region where the display data is located; and
with respect to each of the at least one region to be adjusted, adding a configuration instruction that matches the region to be adjusted to a position before and adjacent to the region to be adjusted in the target region,
wherein determining the at least one region to be adjusted in the region where the display data is located comprises at least one of:
in a case that one piece of data in the region where the display data is located corresponds to a charging-current rise phase, determining the region where the piece of data is located as a region to be adjusted, wherein the configuration instruction is a charging-current increase instruction; and
in a case that another piece of data in the region where the display data is located corresponds to a charging-current retention phase or a charging-current drop phase, determining the region where another piece of data is located as a region to be adjusted, wherein the configuration instruction is a charging-current decrease instruction,
wherein adding the at least one configuration instruction into the target region of the row of data to obtain the target row of data comprises:
adding at least one configuration set into the target region of the row of data to obtain the target row of data;
wherein each of the at least one configuration set comprises the configuration instruction and an instruction identifier adjacent to and before or after the configuration instruction, the instruction identifier being intended to indicate a position of the configuration instruction,
wherein each of the at least one instruction identifier is constituted by at least two different K-codes; and each of the plurality of driver chips comprises a second processor and a second memory operable to store at least one instruction executable by the second processor; wherein the second processor is operable to:

receive a target row of data sent by the controller, wherein the target row of data is a row of data obtained by adding by the controller at least one configuration instruction in a target region of one row of data, the target region comprising at least one of a blank region and a region where display data is located; and self-configure a drive parameter for the first diver chip based on the configuration instruction for the target row of data, and drive a display panel based on display data of the target row of data, wherein self-configuring the drive parameter based on the configuration instruction of the target row of data comprises at least one of:

increasing a drive current of the first driver chip in a case that a charging-current increase instruction is detected in the target row of data; and decreasing the drive current of the first driver chip in a case that a charging-current decrease instruction is detected in the target row of data, wherein after receiving the target row of data sent by the controller, the second processor is further operable to:

each time one instruction identifier is detected, determining an instruction adjacent to and after or before the instruction identifier as a configuration instruction, wherein the instruction identifier is intended to indicate a position of the configuration instruction, wherein each of the at least one instruction identifier is constituted by at least two different K-codes.

* * * * *